US 9,378,852 B2

(12) United States Patent
Walton et al.

(10) Patent No.: US 9,378,852 B2
(45) Date of Patent: Jun. 28, 2016

(54) SPACER GRIDS FOR NUCLEAR REACTOR

(71) Applicant: BWXT mPower, Inc., Charlotte, NC (US)

(72) Inventors: Lewis A Walton, Forest, VA (US); George S Pabis, Lynchburg, VA (US); Andrew W Doan, Lynchburg, VA (US); James G Hatmaker, Lynchburg, VA (US)

(73) Assignee: BWXT mPower, Inc., Charlotte, NC (US)

( * ) Notice: Subject to any disclaimer, the term of this patent is extended or adjusted under 35 U.S.C. 154(b) by 337 days.

(21) Appl. No.: 13/746,116

(22) Filed: Jan. 21, 2013

(65) Prior Publication Data
US 2014/0205055 A1    Jul. 24, 2014

Related U.S. Application Data

(60) Provisional application No. 61/625,130, filed on Apr. 17, 2012.

(51) Int. Cl.
*G21C 3/352* (2006.01)
*G21C 3/356* (2006.01)

(52) U.S. Cl.
CPC .............. *G21C 3/352* (2013.01); *G21C 3/3563* (2013.01); *Y02E 30/40* (2013.01)

(58) Field of Classification Search
USPC ........................................................ 376/462
See application file for complete search history.

(56) References Cited

U.S. PATENT DOCUMENTS

| 4,426,355 | A |   | 1/1984  | Burger             |
|-----------|---|---|---------|--------------------|
| 4,474,730 | A | * | 10/1984 | Hellman et al. ............. 376/462 |
| 4,585,615 | A |   | 4/1986  | Demario            |
| 4,803,043 | A |   | 2/1989  | DeMario et al.     |
| 4,885,127 | A |   | 12/1989 | Yokoyama           |
| 4,895,698 | A |   | 1/1990  | DeMario            |
| 4,923,669 | A |   | 5/1990  | DeMario            |
| 4,957,697 | A |   | 9/1990  | Wada               |
| 4,966,745 | A |   | 10/1990 | Widener et al.     |
| 4,990,304 | A |   | 2/1991  | Rylatt             |
| 4,994,233 | A |   | 2/1991  | Freeman            |
| 4,996,018 | A |   | 2/1991  | Bhatt et al.       |
| 5,009,837 | A |   | 4/1991  | Nguyen et al.      |
| 5,024,806 | A |   | 6/1991  | Cioffi et al.      |

(Continued)

OTHER PUBLICATIONS

International Search Report and Written Opinion dated Nov. 13, 2013 for PCT/US2013/025055.

(Continued)

*Primary Examiner* — Sean P Burke
(74) *Attorney, Agent, or Firm* — Nelson Mullins Riley & Scarborough, LLP

(57) ABSTRACT

A spacer grid includes intersecting straps defining cells with springs and dimples arranged to hold fuel rods passing through the cells. The direction of the springs switches at a switch point in the spacer grid that is not at the center of the spacer grid. The intersecting straps may include a first set of mutually parallel straps including a first transition strap and a second set of mutually parallel straps including a second transition strap, with the second set intersecting the first set. The springs of the first set of mutually parallel straps face away from the first transition strap, and the springs of the second set of mutually parallel straps face away from the second transition strap. The outer straps in some embodiments include dimples but not springs.

21 Claims, 25 Drawing Sheets

(56) References Cited

U.S. PATENT DOCUMENTS

| | | | |
|---|---|---|---|
| 5,030,413 A | 7/1991 | Knierriem et al. |
| 5,043,134 A | 8/1991 | Widener et al. |
| 5,068,083 A | 11/1991 | John, Jr. et al. |
| 5,158,740 A | 10/1992 | Boatwright |
| 5,207,980 A | 5/1993 | Gilmore et al. |
| 5,265,137 A | 11/1993 | Busch |
| 5,268,948 A | 12/1993 | Church et al. |
| 5,282,231 A | 1/1994 | Adams et al. |
| 5,282,233 A | 1/1994 | Bryan |
| 5,299,246 A | 3/1994 | Bryan |
| 5,350,161 A * | 9/1994 | Perrotti ......................... 267/160 |
| 5,367,549 A | 11/1994 | Hatfield |
| 5,434,898 A | 7/1995 | Barkhurst |
| 5,436,945 A | 7/1995 | Weisel et al. |
| 5,488,644 A | 1/1996 | Johansson |
| 5,513,234 A | 4/1996 | Rottenberg |
| 5,519,747 A | 5/1996 | Johansson et al. |
| 5,566,217 A | 10/1996 | Croteau et al. |
| 5,640,434 A | 6/1997 | Rottenberg |
| 5,675,621 A | 10/1997 | Croteau et al. |
| 5,732,116 A | 3/1998 | Petit |
| 5,757,874 A | 5/1998 | Croteau et al. |
| 6,055,288 A | 4/2000 | Schwirian |
| 6,088,420 A | 7/2000 | Yokoyama et al. |
| 6,130,927 A | 10/2000 | Kang et al. |
| 6,275,557 B2 | 8/2001 | Nylund et al. |
| 6,542,567 B1 | 4/2003 | Mayet et al. |
| 6,636,578 B1 | 10/2003 | Clark |
| 6,636,580 B2 | 10/2003 | Murakami et al. |
| 6,810,099 B2 | 10/2004 | Nakamaru et al. |
| 6,819,733 B2 | 11/2004 | Broders et al. |
| 6,865,242 B2 | 3/2005 | Barbe et al. |
| 6,895,067 B2 | 5/2005 | Borum et al. |
| 7,085,340 B2 | 8/2006 | Goldenfield et al. |
| 7,257,185 B1 | 8/2007 | Yamada et al. |
| 7,280,946 B2 | 10/2007 | Russell, II et al. |
| 7,424,412 B2 | 9/2008 | Kropaczek et al. |
| 7,428,479 B2 | 9/2008 | Boer et al. |
| 7,453,972 B2 | 11/2008 | Hellandbrand, Jr. et al. |
| 7,526,058 B2 | 4/2009 | Fawcett et al. |
| 7,548,602 B2 | 6/2009 | Smith, III et al. |
| 7,561,654 B2 | 7/2009 | Makovicka et al. |
| 7,574,337 B2 | 8/2009 | Kropaczek et al. |
| 7,668,280 B2 | 2/2010 | Hellandbrand, Jr. et al. |
| 7,668,284 B2 | 2/2010 | Sparrow et al. |
| 7,769,125 B2 | 8/2010 | Yoon et al. |
| 8,238,511 B2 * | 8/2012 | Jiang et al. ..................... 376/438 |
| 2003/0123600 A1 | 7/2003 | Hesketh et al. |
| 2003/0169839 A1 | 9/2003 | Matteson |
| 2005/0069080 A1 | 3/2005 | Goldenfield et al. |
| 2006/0153327 A1 | 7/2006 | Jiang |
| 2006/0222140 A1 | 10/2006 | Aleshin et al. |
| 2006/0251205 A1 | 11/2006 | Balog |
| 2007/0030943 A1 | 2/2007 | Makovicka et al. |
| 2007/0133732 A1 | 6/2007 | Nakayama et al. |
| 2007/0206717 A1 | 9/2007 | Conner et al. |
| 2008/0084957 A1 | 4/2008 | Aleshin et al. |
| 2009/0032178 A1 | 2/2009 | Feinroth |

OTHER PUBLICATIONS

European Search Report dated Mar. 9, 2016, for EP Application No. 13780970.3.

* cited by examiner

| KEY FOR GRID SCHEMATIC DRAWINGS | |
|---|---|
| | Standard fuel rod |
| | Guide tube |
| | Fuel rod location with a single contact spring |
| | Single contact spring location |
| X | Fuel rod location with a single spring in both directions |
| O | Location where fuel rod would have a single contact spring at every elvation if the grids were rotated |
| % | Instrument guide tube cell where spring direction transition is made |
| T | Guide tube cell where spring direction transition is made |
| ↕ | Vertical transition |
| ↔ | Horizontal transition |
| + | Transition in both directions |
| DDS | Double Dimple Stop |

FIG. 11

TABLE 1 – CATEGORY 1 ALTERNATIVES COMPARISON TABLE

| Single Contact Springs | No. of Single Contact Springs | No. of Grid Cells that have at least One Single Contact Spring | No. of Cells that have Two Single Contact Springs | No. of Single Contact Cells that would be repeated on adjacent grids | No. of Cells that have two single contact springs and would be repeated on adjacent grids | No. of strap types required to fabricate grid | Homogenous and/or symmetric spring layout? | Comments |
|---|---|---|---|---|---|---|---|---|
| Baseline | 26 | 48 | 4 | 25 | 1 | 8 | Yes | |
| Offset | 24(-2) | 47(-1) | 1(-3) | 0(-25) | 0(-1) | 9(+1) | No | Good design but not symmetric or homogenous |
| Offset-2 | 20(-6) | 39(-9) | 1(-3) | 0(-25) | 0(-1) | 10(+2) | No | Good design but not symmetric or homogenous and requires two more strap designs |
| Pinwheel | 24(-2) | 48(0) | 0(-4) | 48(+23) | 0(-1) | 11(+3) | Yes | Too many strap designs |
| Staggered-1 | 24(-2) | 44(-4) | 4(0) | 0(-25) | 0(-1) | 11(+3) | Yes | Too many strap designs |
| Staggered-2 | 24(-2) | 44(-4) | 4(0) | 0(-25) | 0(-1) | 11(+3) | Yes | Too many strap designs |
| Staggered-3 | 20(-6) | 32(-12) | 8(+4) | 0(-25) | 0(-1) | 9(+1) | Yes | Too many cells that have two single contact springs |
| Staggered-4 | 20(-6) | 38(-10) | 2(-2) | 0(-25) | | 9(+1) | Yes | Requires one more strap design than the current design but all other parameters are improved, this design is also more homogenous and symmetric than the current design |

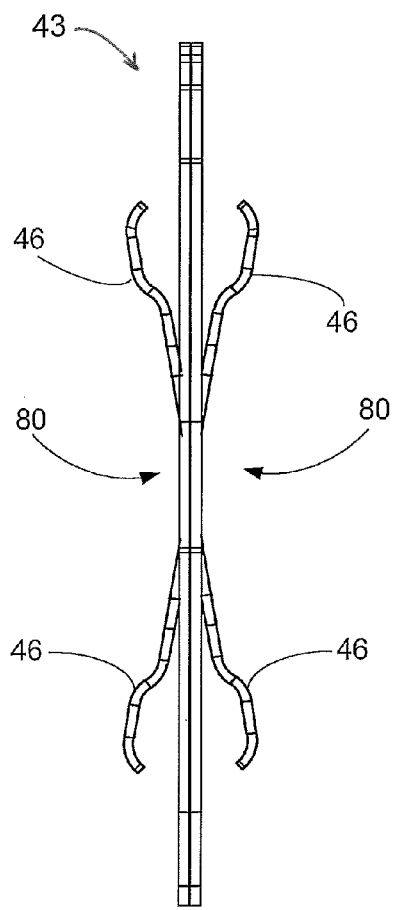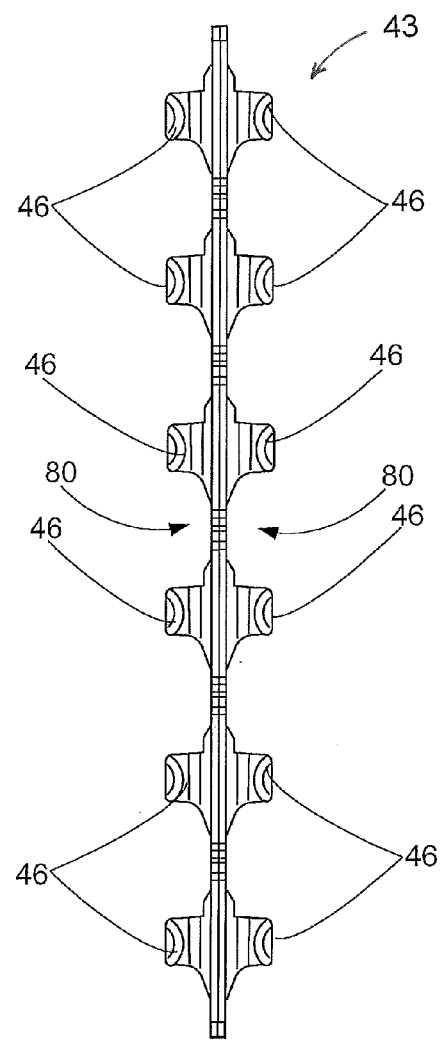
FIG. 23
FIG. 24

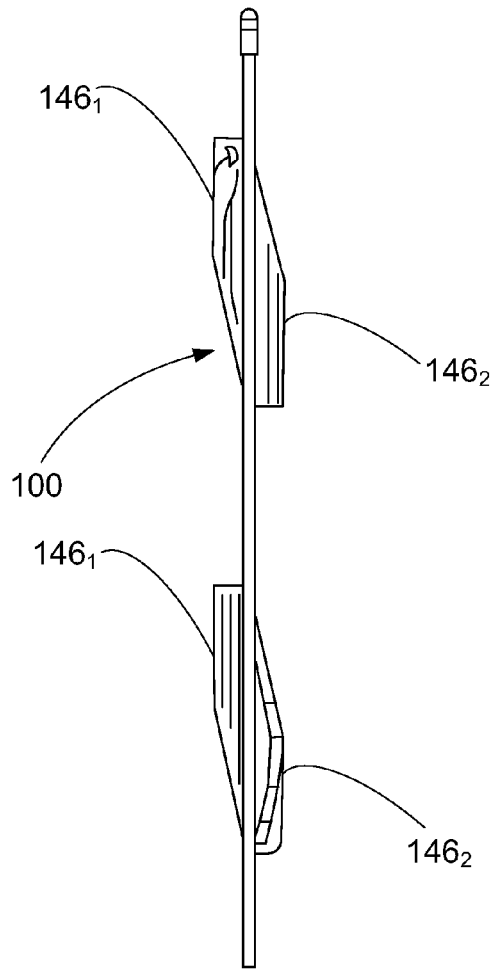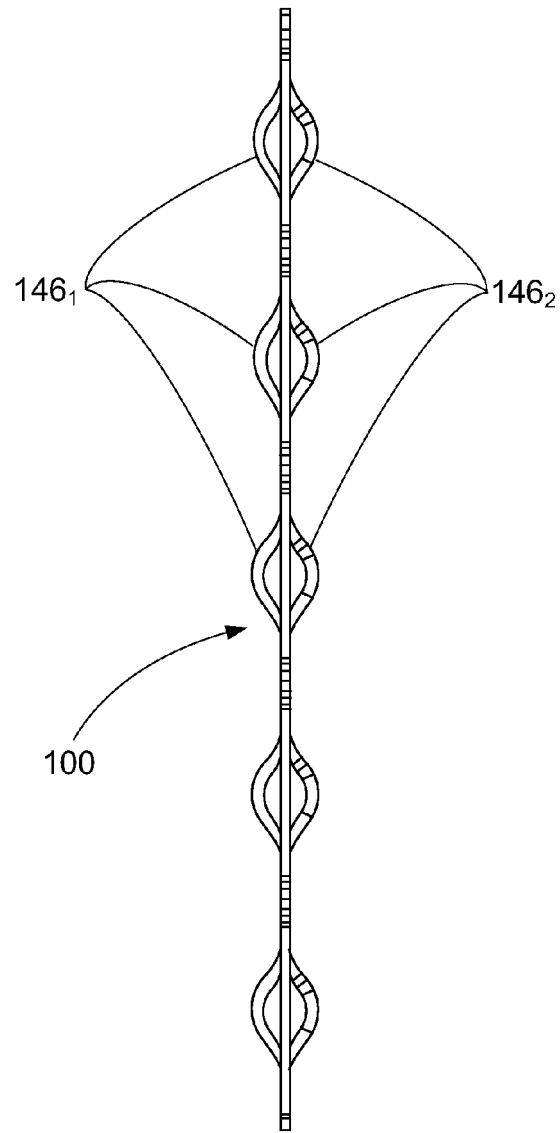
FIG. 29
FIG. 30

SPACER GRIDS FOR NUCLEAR REACTOR

This application claims the benefit of U.S. Provisional Application No. 61/625,130 filed Apr. 17, 2012. U.S. Provisional Application No. 61/625,130 filed Apr. 17, 2012 is hereby incorporated by reference in its entirety.

BACKGROUND

The following relates to the nuclear fuel arts, nuclear reactor arts, nuclear power generation arts, and related arts.

A nuclear reactor core is typically constructed as an array of fuel assemblies (FA's) in which each FA is vertically coextensive with the height of the reactor core and the array of FA's spans the lateral dimensions of the reactor core. Each FA comprises an array of vertically oriented fuel rods held together by a structural skeleton comprising a set of horizontal spacer grids spaced apart along the vertical direction which are welded to guide tubes or other rod-like vertical elements. The upper and lower ends of the FA are capped by upper and lower end fittings (also sometimes called nozzles) connected to the guide tubes by fasteners, welding, or the like.

Conventional spacer grids are constructed by interlocking straps, where each strap is machined (e.g. stamped) from a strip of metal, such as a nickel-chromium alloy (e.g., Inconel™) strip or a zirconium alloy (e.g., Zircaloy™) strip. The intersecting straps define openings, also called cells, through which fuel rods pass. The straps may be machined or stamped to define dimples (i.e., "hard" stops, protrusions having high stiffness) and springs (i.e. "soft" stops, protrusions having low stiffness) in each cell to hold the fuel rod passing through the cell. Typically two dimples are formed from the straps forming two adjacent walls in each square cell. One dimple in each pair is located near the top of the grid strap and the other is located near the bottom of the grid strap. The opposite cell walls each contain a single spring which may either be formed from the strap that makes that cell wall, or in the case of a bi-metallic spacer grid, may be an insert made of a different material that is mechanically trapped or restrained by features formed from the strap that make up that cell wall. The springs are located at or near the mid-plane of the spacer grid, and are sized so that an interference condition exists when a fuel rod is inserted into the grid cell. This interference causes the springs to deflect backwards towards the cell walls on which they are located, preloading the fuel rod in two orthogonal directions against the opposing dimple pair and clamping it in position. The axial offset between the plane of action of the springs and the plane of action of the dimples creates restoring moments that cause the local vertical orientation of the fuel rod at the spacer grids to remain relatively fixed should lateral forces be applied to the fuel rod between any two axially adjacent spacer grids.

The straps in a conventional spacer grid are typically oriented such that the springs in a given cell are on the outboard cell wall and the dimples are on the inboard cell wall. This arrangement has the advantage of providing a more rigid foundation to resist any inward-acting forces that may be applied to the outer row of fuel rods should the fuel assembly contact a neighboring fuel assembly or other adjacent structure during handling. However, because this conventional arrangement requires that the outer strap contain springs in each grid cell, it also results in a significant weakening of those straps which can adversely impact the strength of the overall spacer grid structure. In some conventional spacer grids this weakness is at least partially compensated by using a thicker outer strap and/or via stiffening ribs and other mechanical features. However, this approach results in the outer strap springs having different (typically higher) spring rates than the interior strap springs which can lead to in-service fuel rod bow in the outer row of the fuel rod array.

The following discloses various improvements.

SUMMARY

In one embodiment, a spacer grid includes a plurality of intersecting straps having springs and dimples formed into the straps, the intersecting straps defining cells with the springs and dimples arranged to engage fuel rods passing through the cells. The direction of the springs switches at a switch point in the spacer grid that is not at the center of the spacer grid. The intersecting straps may include (i) a first set of mutually parallel straps including a first transition strap and (ii) a second set of mutually parallel straps including a second transition strap, the second set of mutually parallel straps intersecting the first set of mutually parallel straps, the intersection of the first transition strap and the second transition strap defining the switch point in the spacer grid that is not at the center of the spacer grid. In some embodiments the switch point in the spacer grid is spaced apart from the center of the spacer grid by at least two cells.

In accordance with another aspect, a spacer grid includes intersecting straps having springs and dimples formed into the straps, the intersecting straps defining cells with the springs and dimples arranged to hold fuel rods passing through the cells. The intersecting straps include a first set of mutually parallel straps including a first transition strap, and a second set of mutually parallel straps including a second transition strap. The second set of mutually parallel straps intersects the first set of mutually parallel straps. The first transition strap and the second transition strap are interior straps of the spacer grid. In some embodiments, springs formed into the first set of mutually parallel straps other than the first transition strap face away from the first transition strap, springs formed into the second set of mutually parallel straps other than the second transition strap face away from the second transition strap, dimples formed into the first set of mutually parallel straps other than the first transition strap face toward the first transition strap, and dimples formed into the second set of mutually parallel straps other than the second transition strap face toward the second transition strap. In some embodiments springs are formed into the first and second transition straps but dimples are not formed into the first and second transition straps. In some embodiments dimples are formed into the outer straps of the spacer grid but springs are not formed into the outer straps of the spacer grid. The first transition strap may include two back-to-back straps with springs facing outward, and the second transition strap may include two back-to-back straps with springs facing outward. Alternatively, each of the first and second transition straps may be a single transition strap that includes twice as many springs as any other (non-transition) strap with the springs formed into the first transition strap defining two groups of springs facing in opposite directions.

In accordance with another aspect, a spacer grid including intersecting straps having springs and dimples formed into the straps, the intersecting straps defining cells with the springs and dimples arranged to hold fuel rods passing through the cells, the outer straps of the spacer grid including dimples but not including springs.

BRIEF DESCRIPTION OF THE DRAWINGS

The invention may take form in various components and arrangements of components, and in various process opera- FIG. 1 diagrammatically shows a perspective partial sectional view of an illustrative nuclear reactor of the pressurized water reactor (PWR) variety with internal steam generators (integral PWR).

FIG. 3 shows a side view of an interior strap;

FIG. 4 shows a perspective view of the spacer grid;

FIG. 5 shows a side view of an outer strap;

FIGS. 6 and 7 show alternative spring contact surface designs; and

FIGS. 8 and 9 show front and side views respectively of a dual cantilever spring/dimples contacting structure of an interior strap.

FIG. 11 shows a key defining symbols and representations used in the drawings in depicting diagrammatic overhead views of spacer grid embodiments.

FIG. 13 shows a table comparing the baseline grid design of FIG. 12 with seven alternative designs.

FIGS. 21-24 show an alternative transition strap design comprising back-to-back straps.

FIGS. 28-30 show an alternative transition strap design employing an alternative spring configuration.

DETAILED DESCRIPTION OF THE PREFERRED EMBODIMENTS

Figure 1:
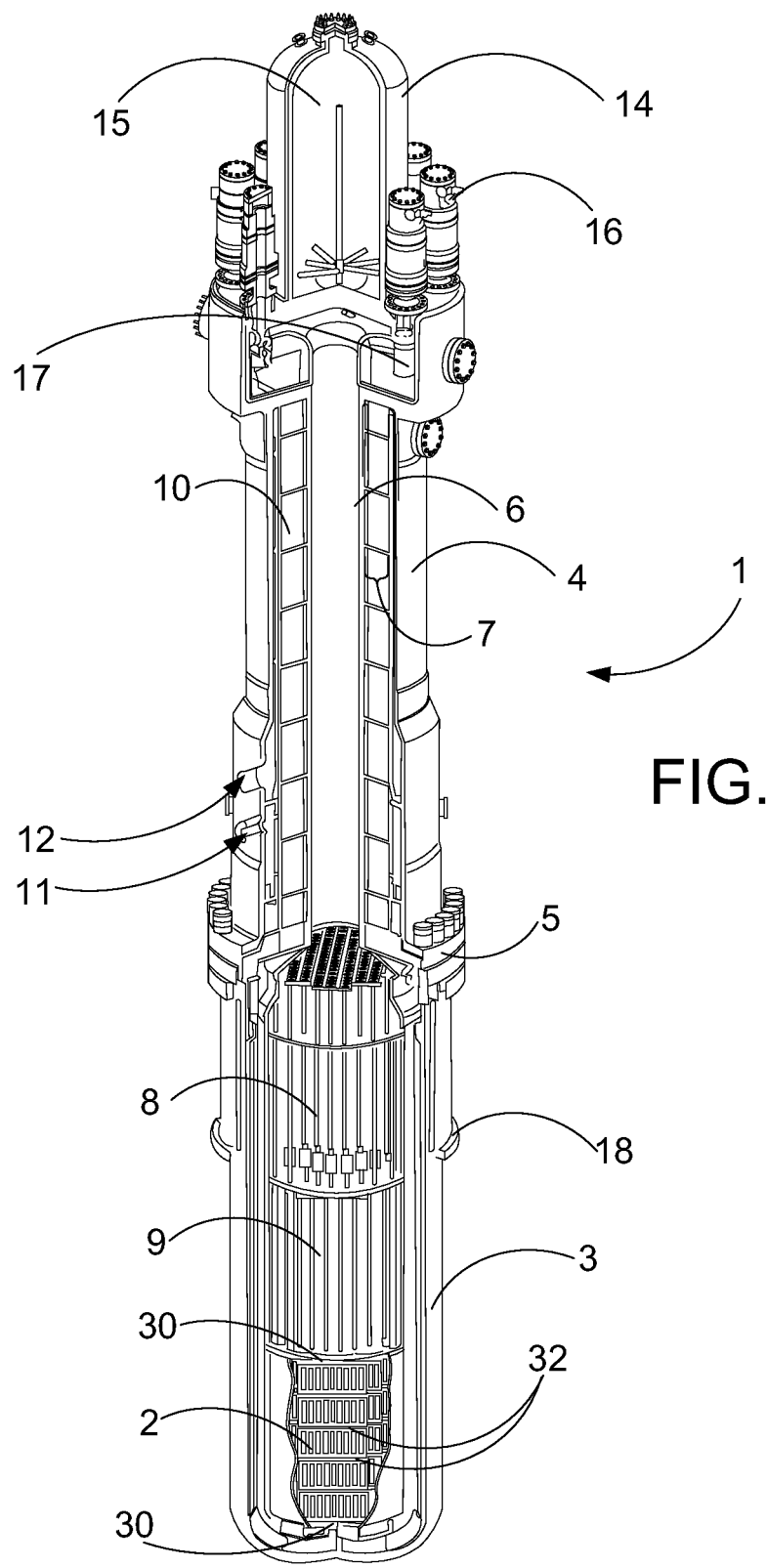

With reference to FIG. 1, an illustrative nuclear reactor 1 of the pressurized water reactor (PWR) variety is shown. The illustrative PWR 1 includes a nuclear reactor core 2 disposed in a pressure vessel which in the illustrative embodiment comprises a lower vessel portion 3 and an upper vessel portion 4 connected by a mid-flange 5. The reactor core 2 is disposed in the lower vessel portion 3, and comprises a fissile material (e.g., $^{235}$U) immersed in primary coolant water. A cylindrical central riser 6 is disposed coaxially inside the cylindrical pressure vessel and a downcomer annulus 7 is defined between the central riser 6 and the pressure vessel. The illustrative PWR 1 includes internal control rod drive mechanisms (internal CRDMs) 8 that control insertion of control rods to control reactivity; however, the reactor can alternatively employ external CRDMs. In either case, guide frame supports 9 guide the translating control rod assembly (e.g., each including a set of control rods comprising neutron absorbing material yoked together by a spider and connected via a connecting rod with the CRDM). The illustrative PWR 1 employs internal steam generators 10 located inside the pressure vessel, but embodiments with the steam generators located outside the pressure vessel (i.e., a PWR with external steam generators) are also contemplated. The illustrative steam generators 10 are of the once-through straight-tube type with internal economizer, and are fed by a feedwater inlet 11 and deliver steam to a steam outlet 12. The illustrative PWR 1 includes an integral pressurizer 14 at the top of the upper vessel section 4 which defines an integral pressurizer volume 15; however an external pressurizer connected with the pressure vessel via suitable piping is also contemplated. The primary coolant in the illustrative PWR 1 is circulated by reactor coolant pumps (RCPs) comprising in the illustrative example external RCP motors 16 driving an impeller located in a RCP casing 17 disposed inside the pressure vessel. The illustrative PWR 1 also includes an optional support skirt 18. It is to be appreciated that the PWR 1 is merely an illustrative example—the disclosed spacer grids and fuel assemblies including same are suitably employed in substantially any type of PWR as well as in nuclear reactors of other types such as boiling water reactor (BWR) designs.

Figure 2:
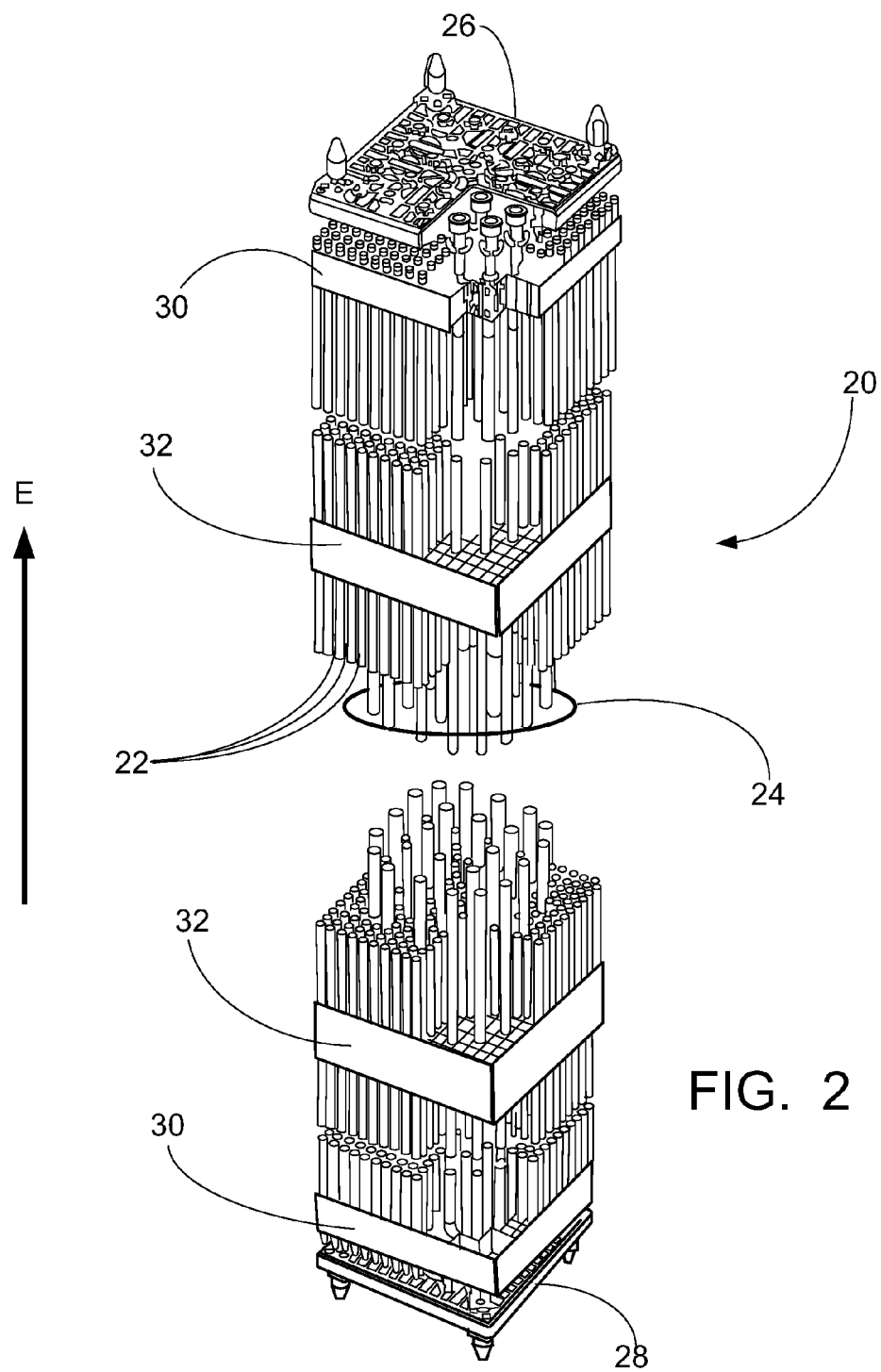
FIG. 2 diagrammatically shows a perspective view of one of the fuel assemblies of the nuclear reactor core of the nuclear reactor of FIG. 1.

With reference to FIG. 2, a representative fuel assembly 20 is diagrammatically shown with partial breakaway and the front top corner of the perspective view cut away to reveal internal components. The fuel assembly 20 is suitably employed as an element of the nuclear reactor core 2 disposed in the pressure vessel of FIG. 1. The fuel assembly 20 includes an array of vertically oriented fuel rods 22 each comprising a fissile material such as $^{235}$U. For example, each fuel rod may contain enriched uranium dioxide ($UO_2$) or mixed $UO_2$/gadolinium oxide ($UO_2$—$Gd_2O_3$) pellets. Interspersed amongst the fuel rods 20 are guide tubes 24 that provide conduits for control rods, instrumentation, or so forth. The top of the fuel assembly 20 is terminated by an upper end fitting or nozzle 26 and the bottom of the fuel assembly 20 is terminated by a lower end fitting or nozzle 28. The vertical direction of the fuel assembly 20 is denoted as the vertical or "elevation" direction E in FIG. 2.

The fuel assembly 20 is held together by a plurality of spacer grids including end grids 30 disposed near the top and bottom of the fuel assembly 20 and one or (typically) more mid-grids 32 disposed at spaced apart positions between the top and bottom of the fuel assembly 20. (Said another way, each end spacer grid 30 is closer to an end of the bundle of fuel rods 22 than the mid-grid 32). Illustrative FIG. 2 shows only two mid-grids 32, but typically additional mid-grids are present which are omitted in the cutaway illustration. The number of mid-grids, and the spacing of the end grids and mid grids along the height of the fuel assembly, is determined based on the total length of the bundle of fuel rods, the total number of fuel rods in the bundle, the structural characteristics of the fuel rods, applicable regulatory requirements, and so forth. As indicated diagrammatically in FIG. 1, the grids 30, 32 of all fuel assemblies typically are aligned with each other so that any contact between adjacent fuel assemblies is grid-to-grid contact. (Such uniformity among the fuel assemblies is also advantageous from a manufacturing standpoint). The grids 30, 32 comprise interlocking metal straps formed from metal sheets by stamping or other machining techniques. The metal may be a nickel-chromium alloy (e.g., Inconel), or a zirconium alloy (e.g., Zircaloy), or so forth. Inconel is stronger than Zircaloy; however, Zircaloy has a smaller neutron absorption cross-section as compared with Inconel. Thus, in some embodiments the end grids 30 are made of Inconel while the mid-grids 32 are made of Zircaloy.

Figure 3:
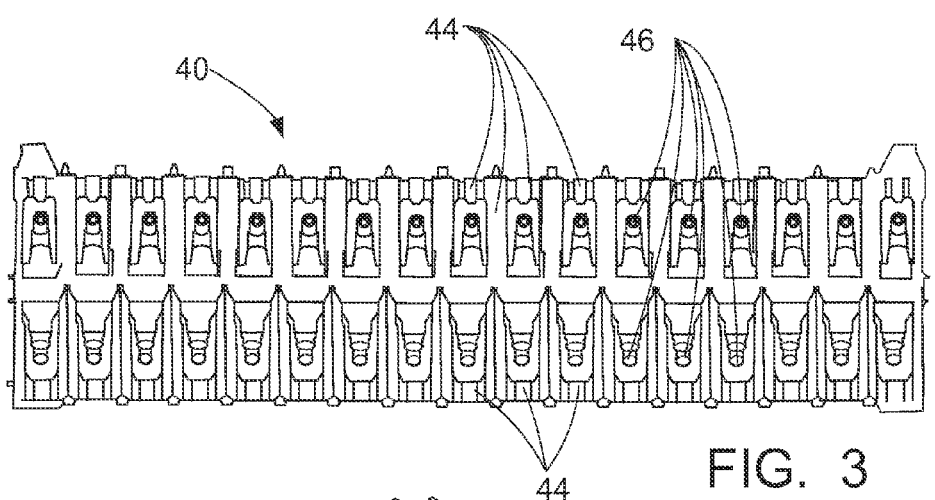
FIGS. 3-9 diagrammatically show one of the spacer grids of the fuel assembly of FIG. 2, where.
Figure 4:
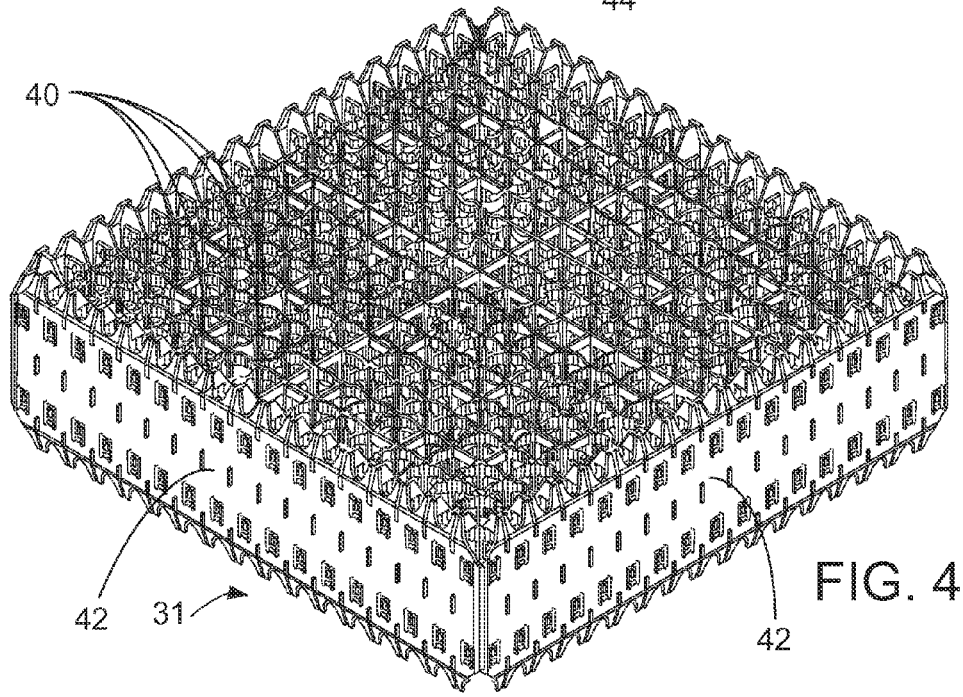
Figure 5:
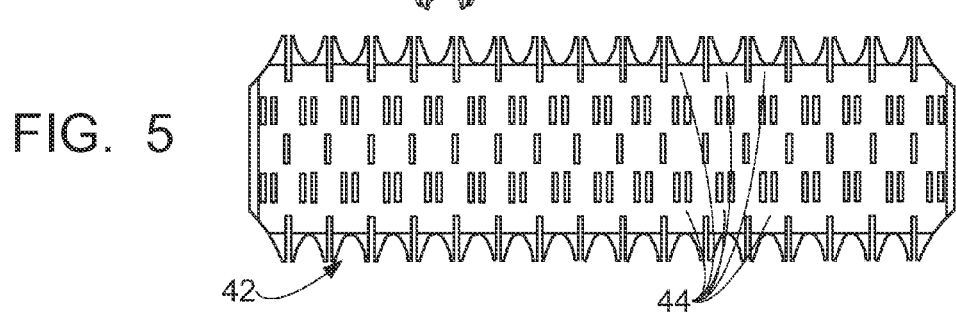

With reference to FIGS. 3-5, some design features of some illustrative spacer grids disclosed herein are shown. FIG. 4 shows a perspective view of an illustrative spacer grid 31 (where the grid 31 may in general serve as either one of the end grids 30 or one of the mid-grids 32 shown in FIG. 2). FIG. 3 shows an interior strap 40 of the grid 31, while FIG. 5 shows an outer strap 42 of the grid 31. Each standard cell defined by intersecting interior straps contains horizontally oriented dimple features (or stops) 44 at the top and bottom edges sandwiched around a pair of vertically-oriented cantilever spring features 46. The cantilever spring features 46, which are designed to have a large elastic deflection range compared with the dimples 44, are formed with their main surfaces inclined relative to the remainder of the vertical cell wall so as to create a substantial interference with the fuel rod. When the fuel rod is inserted into the fuel assembly during manufacturing, these dual spring features 46 are deflected back towards the vertical cell wall, creating a clamping force that pins the fuel rod against the opposing dimple pair 44. This same clamping action is simultaneously actuated at 90 degrees around the cladding by the spring and dimple features in the perpendicular cell walls. The outer straps 42 on the illustrative spacer grids 31 contain dimple features 44 only. This configuration has an advantage over grid designs that have spring features on the outer straps in that the material cutouts on the outer strap are minimized, enhancing the structural strength of the outer straps.

The spring and dimple features are replaced in the guide tube cells with saddle features that position the control rod guide tubes accurately without generating any appreciable clamping force. Rather, the guide tubes are welded to the grids 31 to form (optionally along with the nozzles 26, 28) the structural skeleton of the fuel assembly 20. Optional integral tabs on the top and bottom edges of the interior grid straps in these special cells (not shown) are used to attach the mid-grids 32 to the control rod guide tubes permanently during fuel assembly manufacturing.

Figure 6:
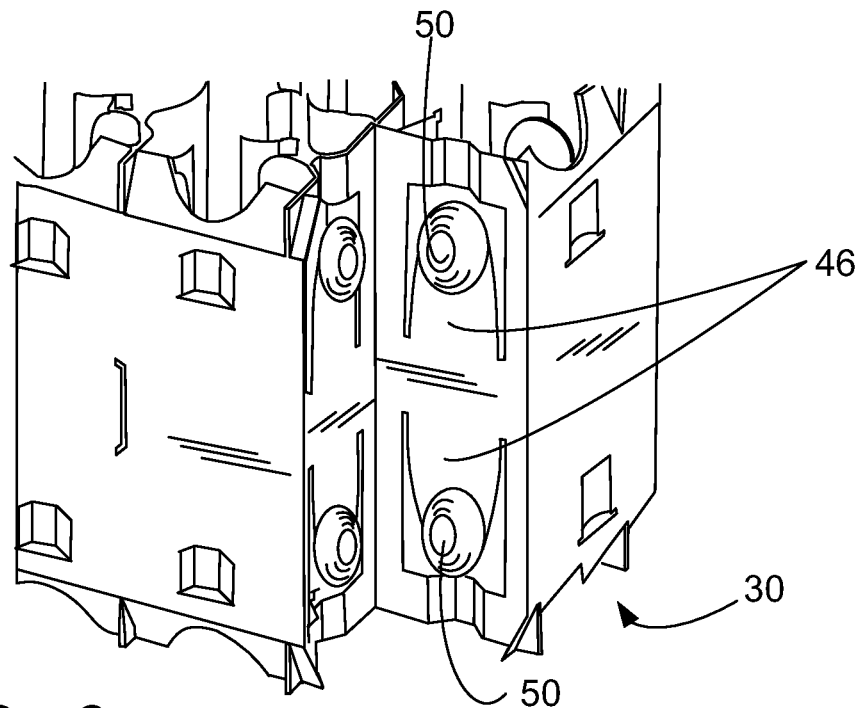
Figure 7:
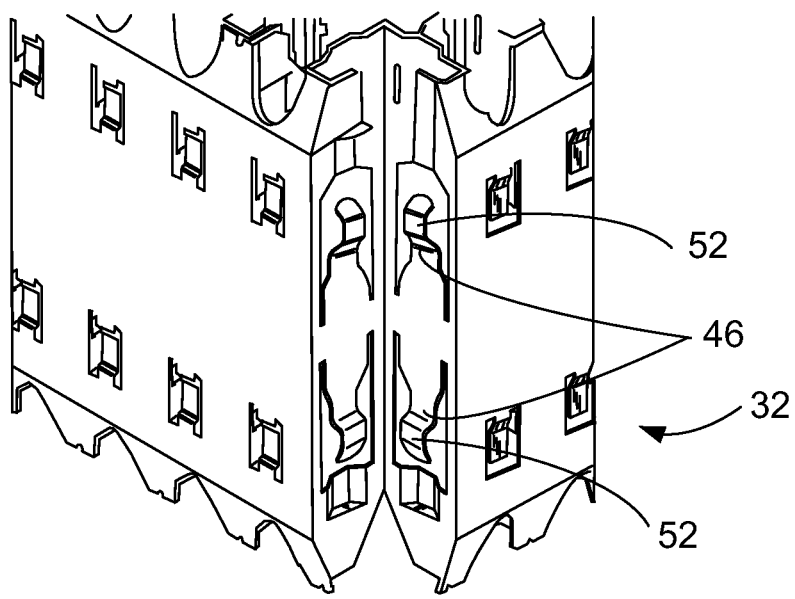

With reference to FIGS. 6 and 7, the contact surfaces of the springs 46 of the interior straps 40 can have various shapes. In choosing the shape of the contact surfaces, factors such as fuel rod lead-in, ductility or brittleness of the material, and so forth are suitably taken into account. For example, if the end-grids 30 are made of Inconel, which is relatively ductile, the contact surfaces can be shaped as flat-topped domes 50 to provide good lead-in/fuel rod engagement surfaces for the springs. On the other hand, if the mid-grids 32 are made of more brittle Zircaloy, then the contact surfaces can be shaped as more simple-to-manufacture hooks 52 formed by bending the free ends of the springs as to include a flat rod engagement portion and a distal "bent-back" portion that facilitates lead-in.

To avoid having springs in the outer straps 42, all of the springs 46 in this grid design face from the center of the grid outward. Accordingly, there is a transition point or points in the grid where the spring direction reverses. In the baseline grid design, this spring direction transition occurs near the center of the grid.

Figure 8:
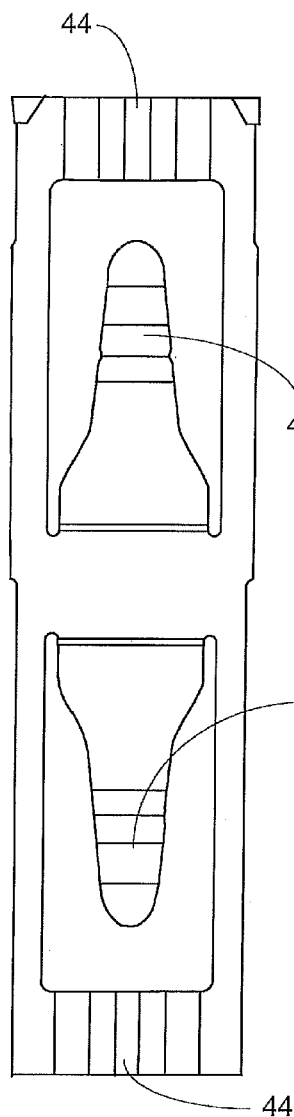
Figure 9:
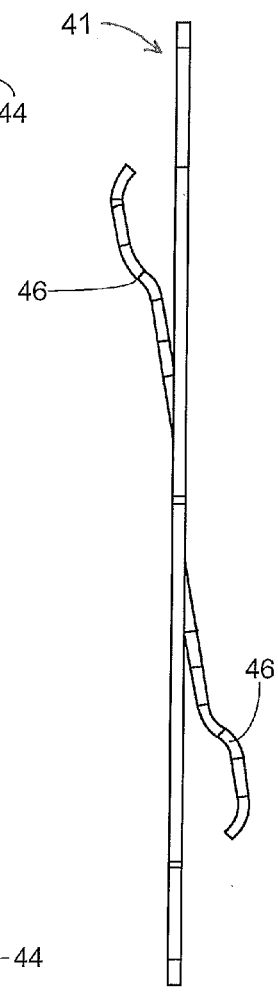

With reference to FIGS. 8 and 9, a single fuel rod engagement portion is shown in front profile and side profile respectively, illustrating the dimples 44 and springs 46. Note that the dimples 44 shown in FIGS. 8 and 9 engage one cell (namely the cell "behind" in FIG. 8 or "to the right" in FIG. 9) while the springs 46 engage another cell (namely the cell "in front" in FIG. 8 or "to the left" in FIG. 9).

In one embodiment, spacer grid 31 (FIG. 4) includes a plurality of intersecting straps 40, 42 having the springs 46 and dimples 44 of FIGS. 8 and/or 9 formed into the straps. The intersecting straps 40, 42 define cells with the springs and dimples arranged to engage (i.e., hold) fuel rods passing through the cells. The intersecting straps 40, 42 include (i) a first set of mutually parallel straps including a first transition strap and (ii) a second set of mutually parallel straps including a second transition strap, the second set of mutually parallel straps intersecting the first set of mutually parallel straps. The springs 46 formed into the interior straps 40 of the first set of mutually parallel straps (other than the first transition strap) face away from the first transition strap, and the springs 46 formed into the interior straps 40 of the second set of mutually parallel straps (other than the second transition strap) face away from the second transition strap. Similarly, the dimples 44 formed into the straps of the first set of mutually parallel straps (other than the first transition strap) face toward the first transition strap and the dimples 44 formed into the straps of the second set of mutually parallel straps (other than the second transition strap) face toward the second transition strap.

Figure 10:
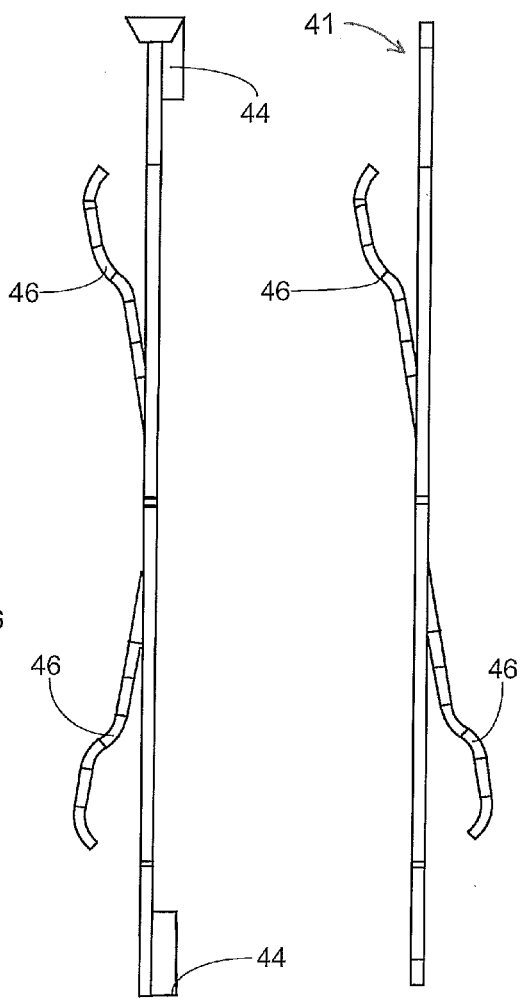
FIG. 10 shows a side view of a transition strap with an "S"-shaped dual cantilever spring configuration.

With reference to FIG. 10, to utilize two grid transition straps 41 to make the transition (one in each direction orthogonal to each other, i.e. the aforementioned first transition strap and second transition strap), the dual contact cantilever spring of FIGS. 8 and 9 is replaced in the transition straps 41 with an "S" shaped, single contact spring configuration shown in FIG. 10 in which the directions of the upper and lower springs 46 are reversed. Additionally, there is no need for the dimples 44 on the grid straps of FIG. 10 as at the transition both sides engage the proximate fuel rods via the springs 46. In the transition strap 41 of FIG. 10, one half of the springs face in one direction and the other half of the springs face in the opposite direction.

Figure 12:
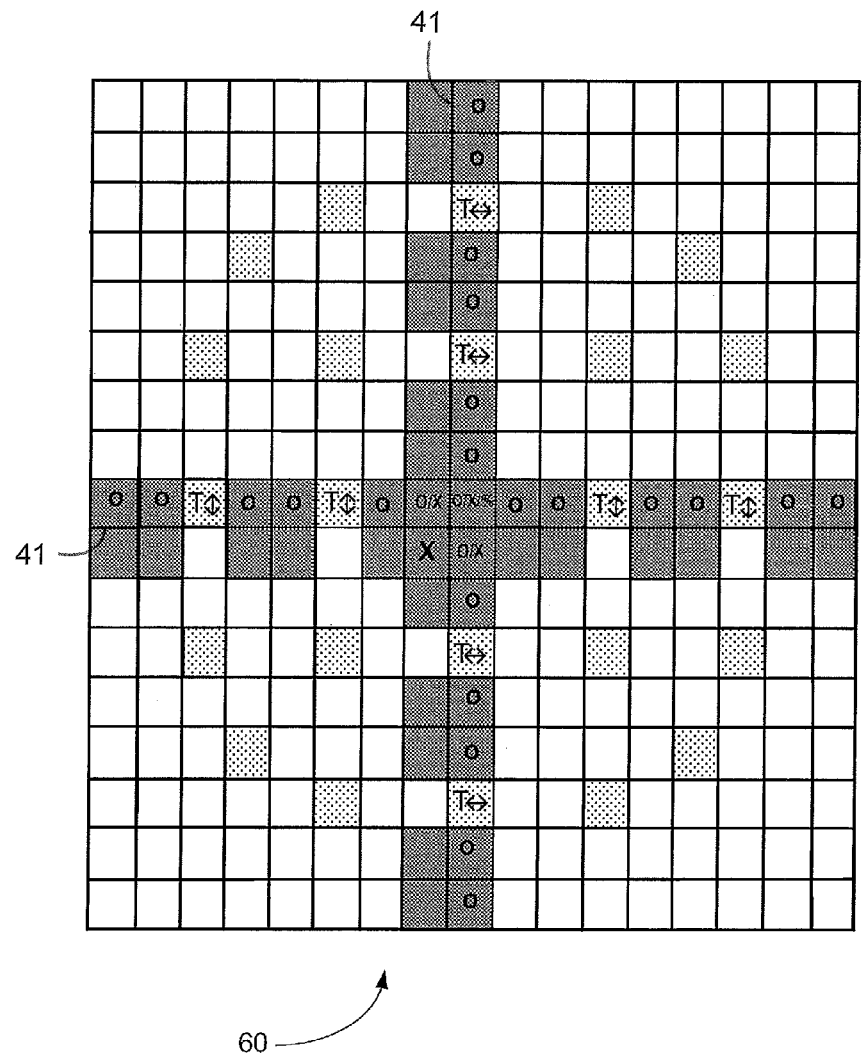
FIG. 12 shows a diagrammatic overhead view of a baseline spacer grid embodiment.

With reference to FIG. 11, in the grid design examples described herein are illustrated in FIGS. 12 and following as diagrammatic overhead views using lines to represent straps viewed "on edge" from above (or below) the grid. Symbolic representations (e.g., hatching, cell labeling, line types, et cetera) shown in the key of FIG. 11 are used to identify relevant features such as guide tube locations, various types of fuel rod locations (differentiated based on number of springs), transition regions where springs transition from facing one direction to the opposite direction, and so forth. Cells designated for guide tubes are also labeled (where appropriate) to indicate transitions using the letter "T" along with a double-headed arrow indicating the transition direction, as defined in FIG. 11. Any of the grids design examples described herein may serve as the grid 31 of FIGS. 3-5, and may more particularly serve as the design for the end-grids 30 or mid-grids 32 of FIG. 2. In the examples of FIGS. 12 and forward, it is assumed that the strap 41 of FIG. 10 is employed at transitions so that some cells have missing springs (the number of missing springs in the cell being indicated by symbols defined in the key of FIG. 11). As set forth in the examples of FIGS. 12 and following, by appropriate grid design the number of missing springs for any given cell along the transitions can be managed.

With reference to FIG. 12, a baseline grid design 60 is shown. In this design, some fuel rod cells at the transitions have single contact springs in one direction and double contact springs in the orthogonal direction. Since the ideal configuration is a fuel rod cell with dual contact springs in both directions, adjacent grids on the fuel assembly (in the vertical or "elevation" direction E denoted in FIG. 2) are preferably rotated by 90 degrees relative to each other to decrease the number of fuel rods that have single contact springs at every grid elevation. Despite the grid rotations, there will still be a limited number of fuel rod cells in the fuel assembly 20 that have a single contact spring in at least one direction at every grid elevation. These locations are marked with a "O" in FIG. 12 (see key of FIG. 11). Four fuel rod cells near the center of the baseline grid 60 have single contact springs in both directions. These locations are marked with a "X". Again, rotating adjacent grids along the fuel assembly length will minimize the number of fuel rods that have single contact springs in both directions. However, the center fuel rod cell will have single contact springs in both directions along the full length of the fuel assembly. This cell is marked with a "%".

The dual cantilever spring arrangement described with reference to FIGS. 8-9 combined with the near-alignment of the planes of action of the springs 46 with the planes of actions of the opposing dimples 44 minimizes the induced fuel rod bow. Eliminating the spring cutouts on the outer straps 42 (FIG. 5) makes for a much stronger spacer grid during lateral impacts. The disclosed grid design 60 also minimizes the number of different types of straps are required to make the grid 60 and keeps the number of single spring contacts to a minimum. In an alternative approach, to reduce the number of single spring contacts additional strap types could be added.

With reference to FIG. 13 and following, some alternative grid designs are disclosed. FIG. 13 tabulates the illustrative alternative grid designs while FIGS. 14-20 diagrammatically illustrate these alternative designs using the notation defined in FIG. 11. The disclosed alternatives to the baseline spacer grid design 60 of FIG. 12 can be divided into two categories. The first category, referred to as "Category 1", are tabulated in FIG. 13 and shown by diagrammatic example in FIGS. 14-20. These include grid design alternatives that maintain the basic spring and dimple design but change the arrangement of these features within the grid.

A second category of alternatives, referred to as "Category 2", includes changes to the basic spring geometry and changes to the baseline spacer grid structural arrangement as described with reference to FIG. 21 and forward.

Some of the alternate grid designs provide improvements over the grid design 60 of FIG. 12 but at the expense of increased complexity. This increased complexity may not be desirable for a manual forming operation. However, a production Computer Numerical Control (CNC) stamping operation is contemplated for manufacturing the grid straps, and CNC manufacturing would be relatively immune to the increased complexity.

With continuing reference to FIGS. 13-20, the Category 1 grid design alternatives include design alternatives where guide tube cells are utilized to make spring reversals. Making spring reversals at guide tube locations advantageously minimizes the number of fuel rod cells that have single contact springs, but also increases the number of strap types that are required to make a complete grid. The disclosed Category 1 alternatives also include designs that move the single contact spring transition away from the center of the grid to take advantage of adjacent grid rotations to minimize the number of fuel rod cells that have single contact springs along the full length of the fuel assembly. The disclosed Category 1 alternatives are described in the following with reference to the diagrammatic grid representations of FIGS. 14-20, and are compared to each other in the Table of FIG. 13.

Figure 14:
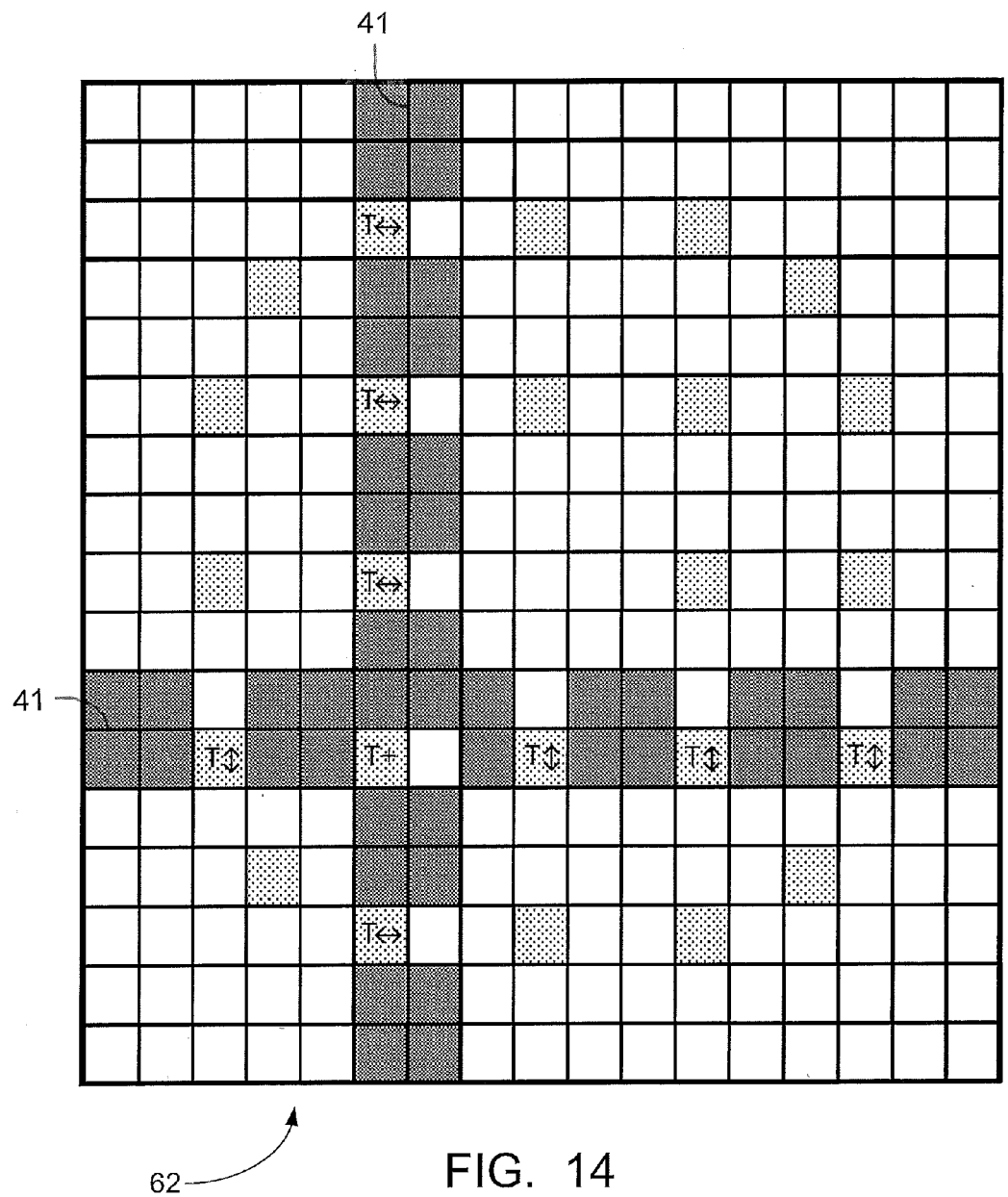
FIGS. 14-20 shows diagrammatic overhead views of the seven alternative spacer grid embodiments tabulated in the table of FIG. 13.

With reference to FIG. 14, a grid design 62 is diagrammatically shown which is referred to herein as the "Offset Single Contact Spring Strap" design (called the "Offset" design in FIG. 13). The Offset Spring Configuration 62 of FIG. 14 takes the baseline design 60 of FIG. 12 and shifts the transition over a couple straps away from center. An advantage of grid design 62 is that it reduces the number of single contact spring cell locations that are repeated on vertically adjacent grids.

Figure 15:
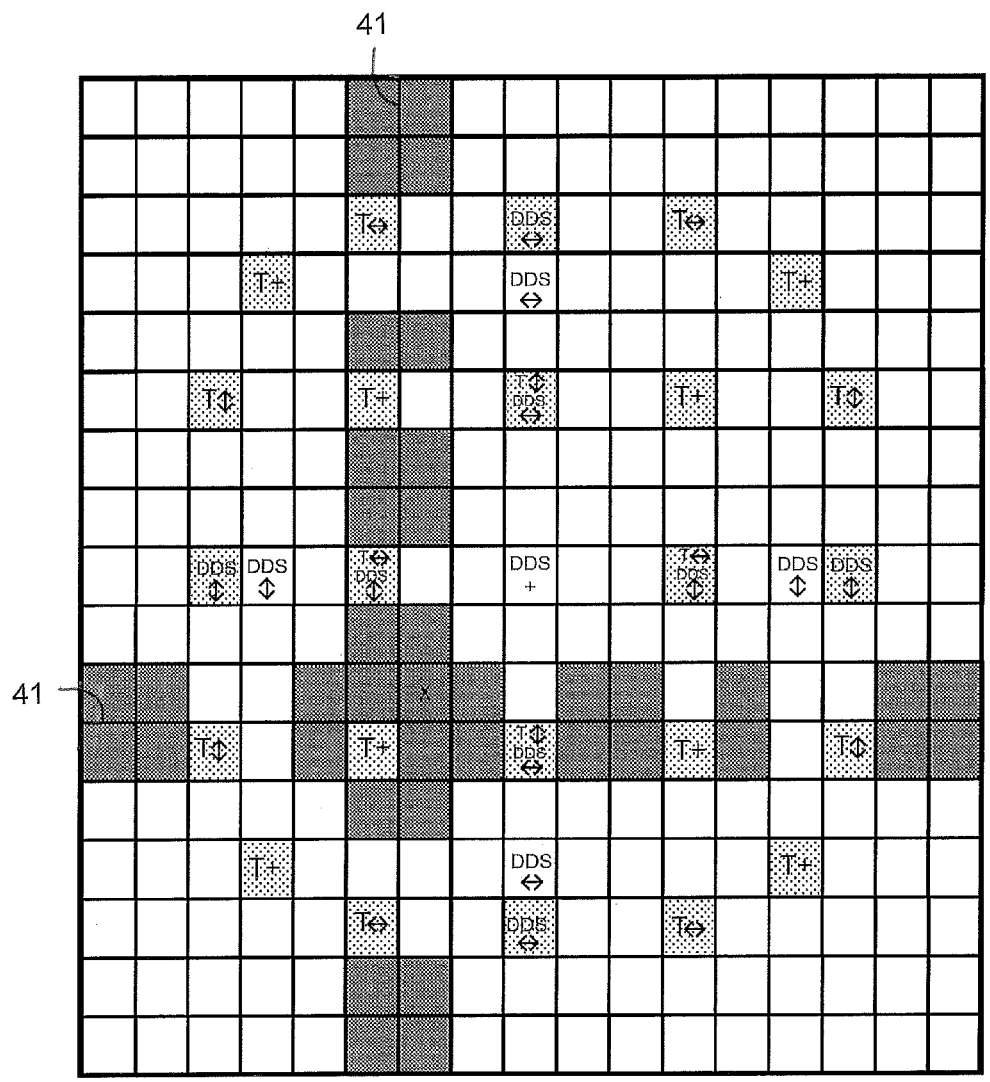

With reference to FIG. 15, a grid design 64 is diagrammatically shown which is referred to herein as the "Offset-2 Single Contact Spring Strap" design (called the "Offset-2" design in FIG. 13. The Offset-2 grid design 64 is similar to the Offset grid design 62 of FIG. 14 except that the guide tube locations are employed to make the spring direction reversal. The Offset-2 grid 64 adds complexity but further reduces the number of fuel rod cells with single contact springs.

Figure 16:
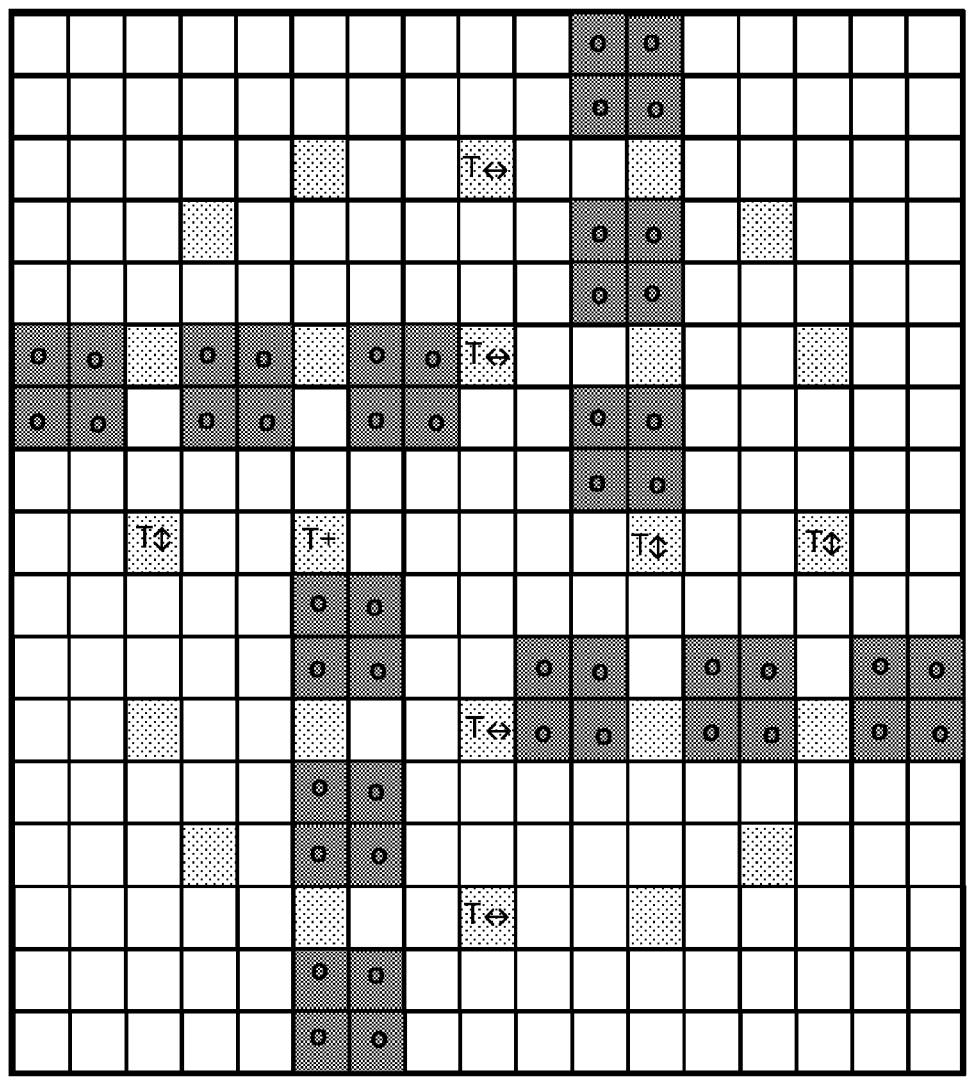

With reference to FIG. 16, a grid design 66 is diagrammatically shown which is referred to herein as the "Pinwheel Single Contact Spring Strap" design (called the "Pinwheel" design in FIG. 13). The Pinwheel grid design 66 provides a more uniform distribution of the single contact springs and reduces the number of fuel rod cells with single contact springs. The Pinwheel design 66 increases the number of fuel rod cells with single contact springs on adjacent grids.

Figure 17:
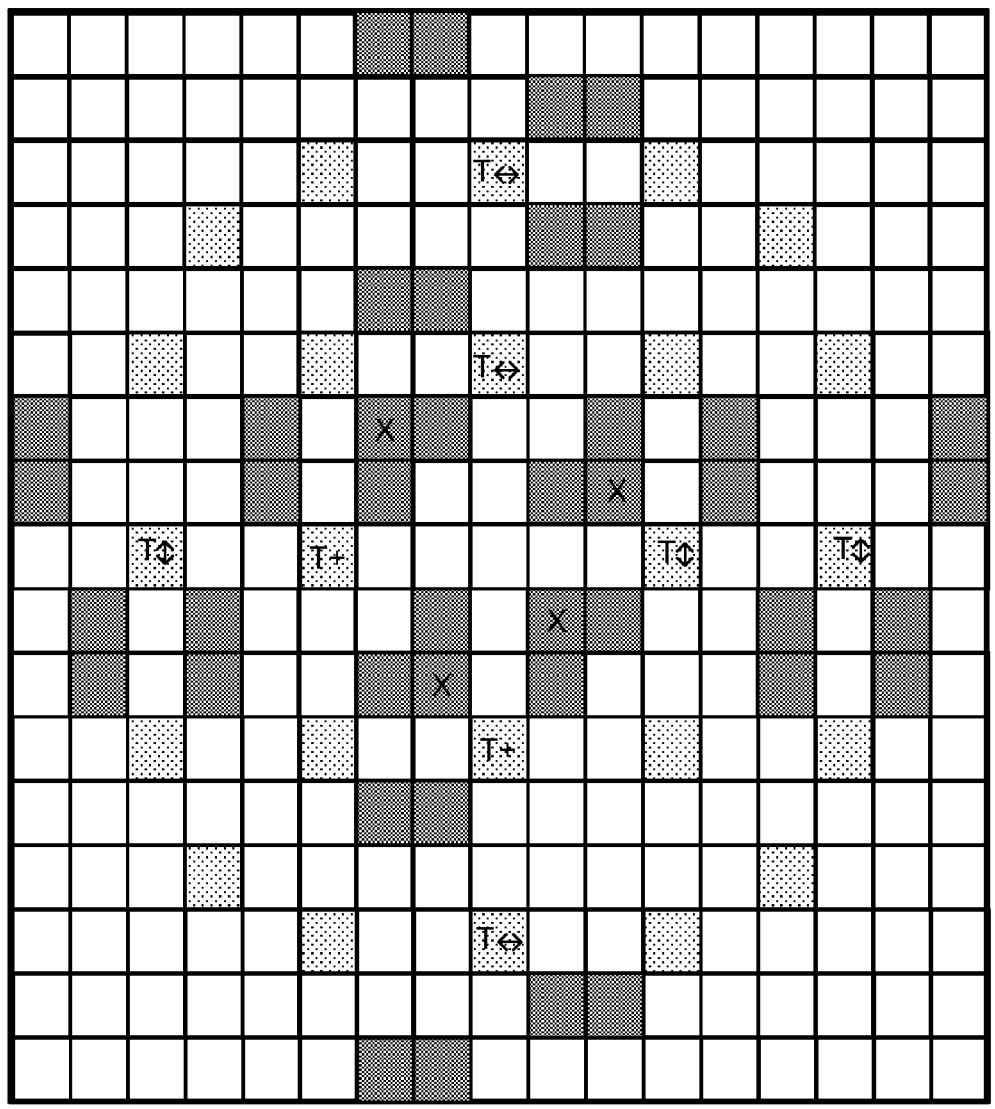

With reference to FIG. 17, a grid design 68 is diagrammatically shown which is referred to herein as the "Staggered-1 Single Contact Spring Strap" design (called the "Staggered-1" design in FIG. 13). The Staggered-1 grid design 68 attempts to distribute the single contact fuel rod cells evenly throughout the grid. While this design reduces the number of single contact springs, the number of different grid strap designs required to make a grid goes up by three.

Figure 18:
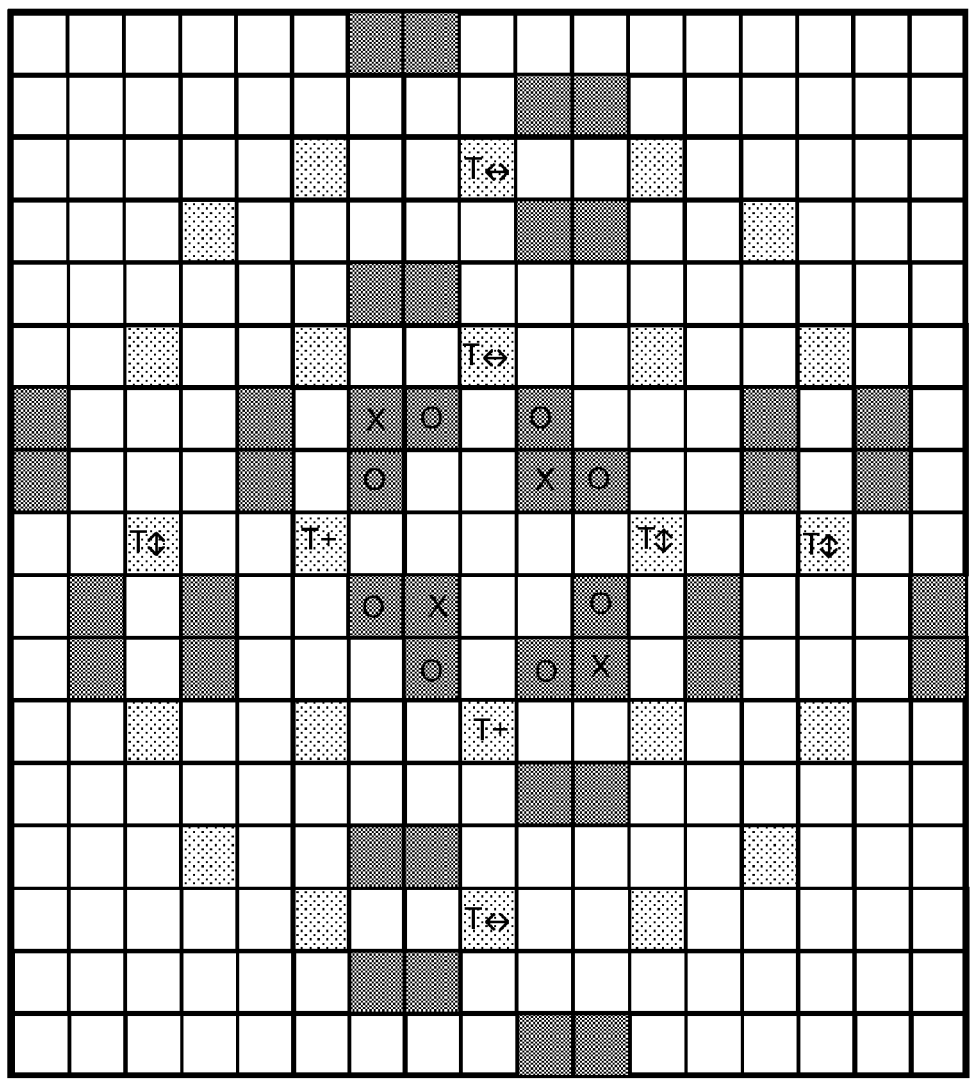

With reference to FIG. 18, a grid design 70 is diagrammatically shown which is referred to herein as the "Staggered-2 Single Contact Spring Strap" design (called the "Staggered-2" design in FIG. 13). The Staggered-2 grid design 70 is a variation of the Staggered-1 grid design 68 of FIG. 17. While this design reduces the number of single contact springs, the number of different grid strap designs required to make a grid goes up by three.

Figure 19:
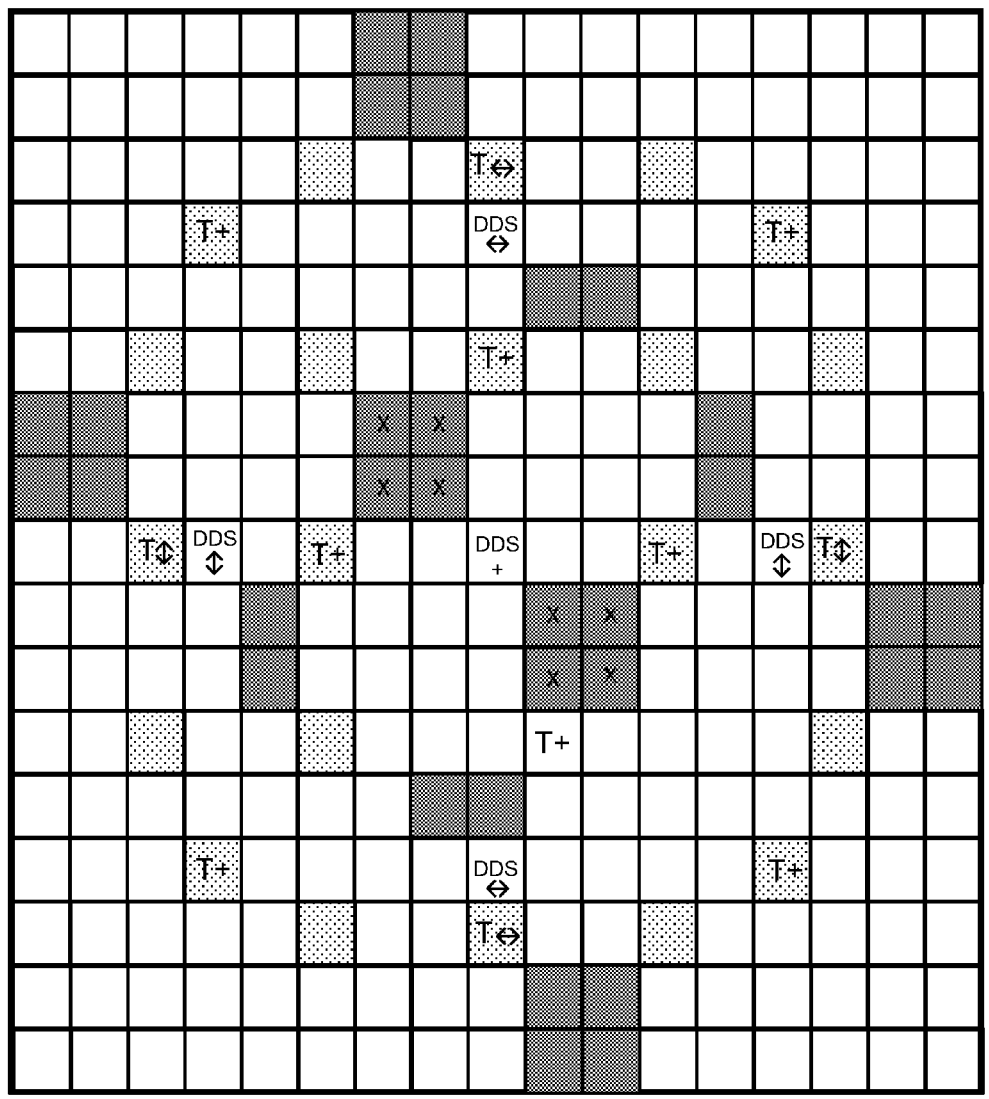

With reference to FIG. 19, a grid design 72 is diagrammatically shown which is referred to herein as the "Staggered-3 Single Contact Spring Strap" design (called the "Staggered-3" design in FIG. 13). The Staggered-3 grid design 72 is another variation of the Staggered-1 grid design 68 of FIG. 17. Advantages of the grid design 72 are that it reduces the number of fuel rod cells containing one single contact spring and only adds one additional grid strap design required to make the grid. However, a disadvantage of the grid design 72 is that it adds four additional fuel rods cells for which there are two single contact springs.

Figure 20:
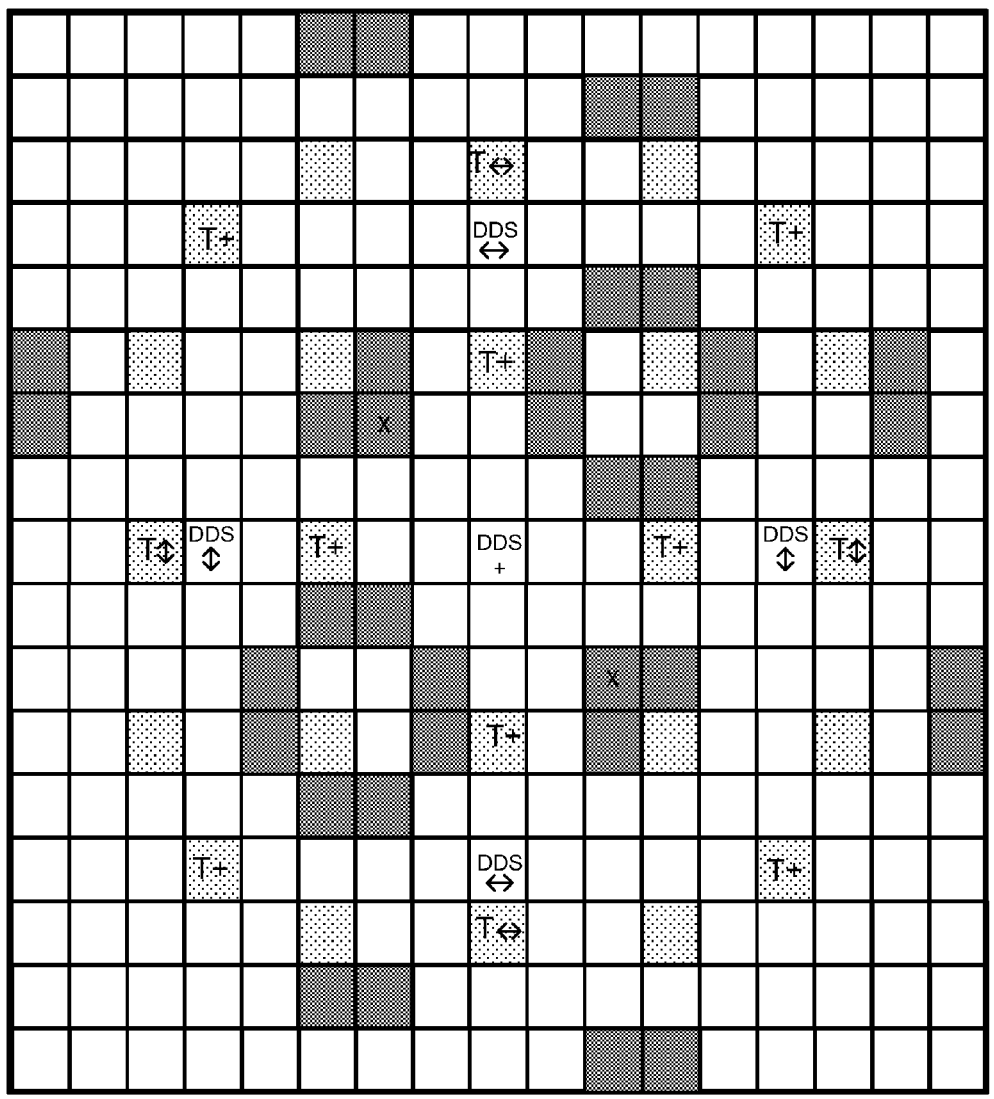

With reference to FIG. 20, a grid design 74 is diagrammatically shown which is referred to herein as the "Staggered-4 Single Contact Spring Strap" design (called the "Staggered-4" design in FIG. 13). The Staggered-4 grid design 74 is another variation of the Staggered-1 grid design 68 of FIG. 17. The grid design 74 reduces the number of single contact springs and eliminates single contact spring locations on adjacent grids. This design does add complexity and increases the required number of grid straps to fabricate a grid by one.

Figures 21, 22:
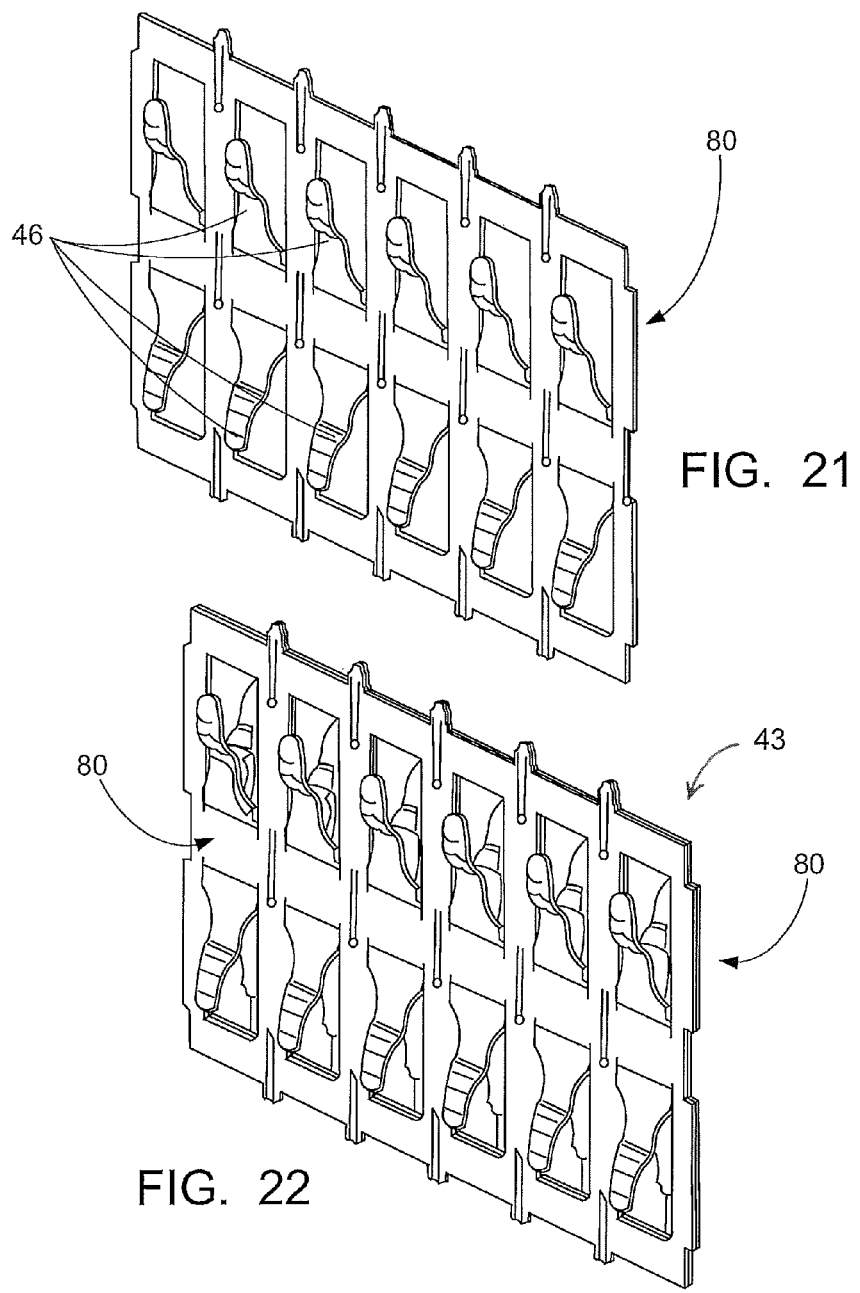

With reference to FIG. 21 and following, the Category 2 grid design alternatives are next described. The Category 2 grid designs include changes to the spring geometry at the transitions, and changes to the baseline spacer grid structural arrangement (e.g., changes to the baseline design 60 of FIG. 12). The Category 2 alternatives are described below.

With reference to FIGS. 21-24, an alternative design of the Category 2 variety employing a back-to-back double strap 43 design is described. In this design the modified transition strap 41 described with reference to FIG. 10 is replaced by a "back-to-back" strap 43 design in which two all-spring (no dimple) interior straps 80 are arranged in a back-to-back configuration. Each strap 80 includes the springs 46 of the conventional interior strap 40 (see FIGS. 3, 8, and 9) but omits the dimples 44. FIG. 21 shows a perspective view of a portion of one of the transition straps 80, while FIG. 22 shows a perspective view of a portion of the back-to-back arrangement of two such straps 80. FIG. 23 shows a side view of the back-to-back arrangement of straps 80 of FIG. 22, while FIG.

24 shows an overhead view (or a view from below) of the back-to-back arrangement of straps 80. This arrangement provides better structural support (eight-contact rather than seven-contact, i.e. no "missing" springs) to the fuel rods in the middle rows of the array and may improve grid impact strength. The spring lead-in formations on the doubled straps would typically be made shallower than the standard spring lead-in formations on the other interior grid straps in order to accommodate the extra thickness of the two back-to-back straps, thus requiring unique forming dies for these straps.

Figure 25:
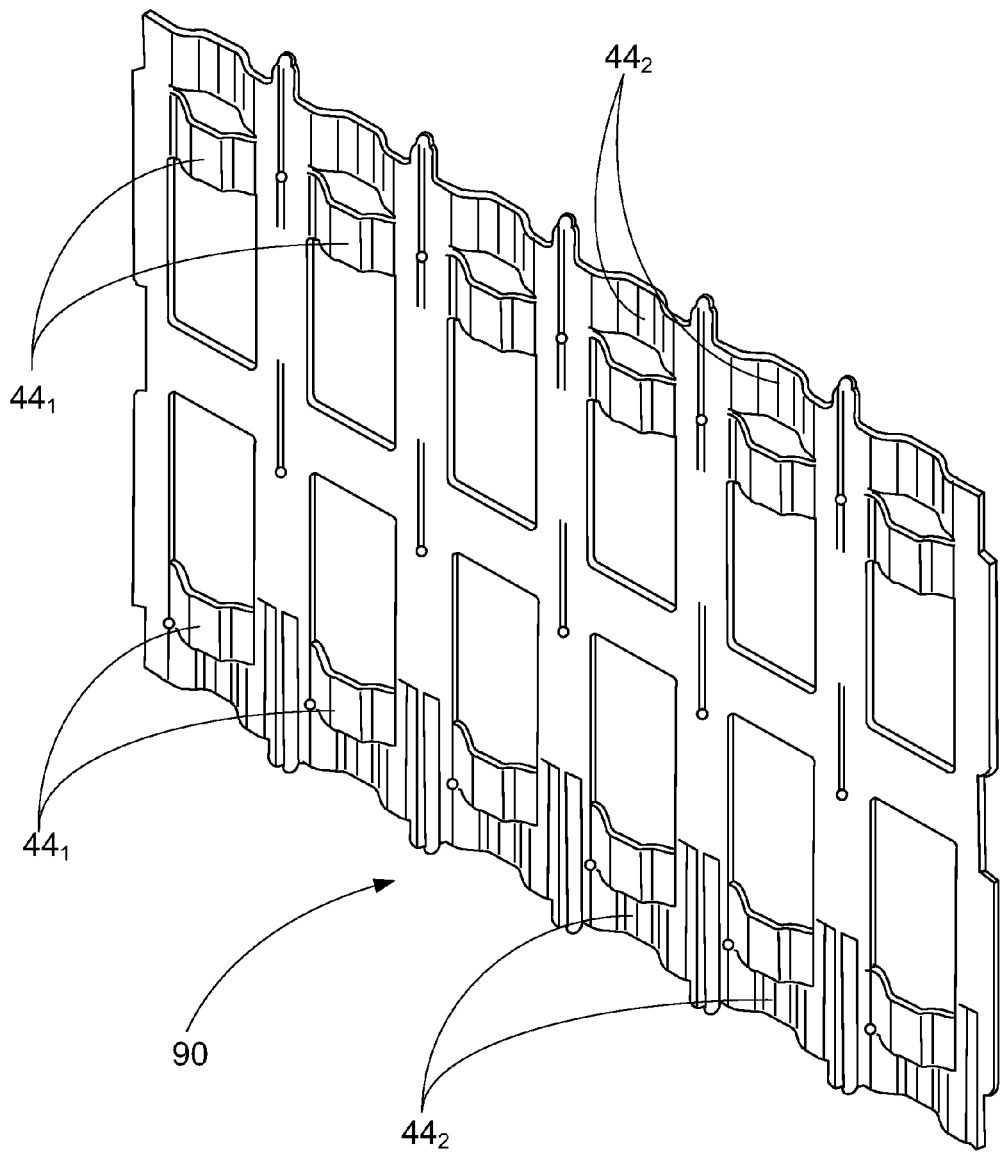
FIGS. 25-27 show an alternative transition strap design including a doubled set of dimples.
Figures 26, 27:
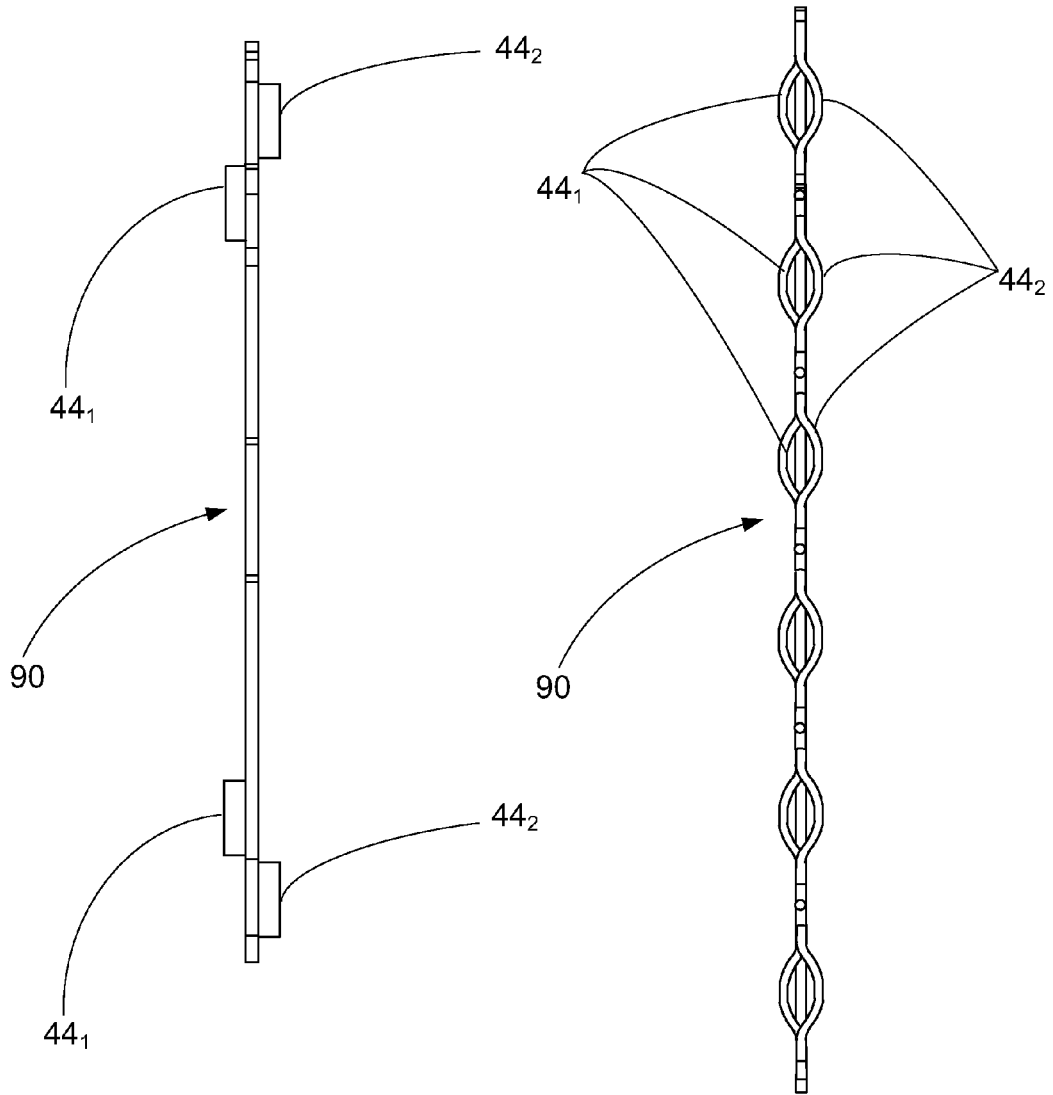

With reference to FIGS. 25-27, another option for replacing either the alternating-spring transition strap 41 configuration (FIG. 10) or the double transition strap 43 configuration (FIGS. 21-24) is to have a (single) transition strap 90 with two sets of dimples $44_1$, $44_2$ facing in opposite directions. FIG. 25 shows a perspective view of a portion of the transition strap 90, FIG. 26 shows a side view of the transition strap 90, and FIG. 27 shows an overhead view (or a view from below) of the strap 90. The transition strap 90 thus includes twice as many dimples as an ordinary (i.e., non-transition) interior strap. Since both sets of dimples $44_1$, $44_2$ can be formed from a single metal strip and would have the same contours as the dimples 44 of the existing interior strap 40 (see FIGS. 3, 8, and 9), this alternative avoids the need for a unique die and does not introduce the same magnitude of flow diversion as the double transition strap design of FIGS. 21-24. A downside of the strap 90 is that it requires spring cutouts on the outer straps, which could potentially weaken the mid-grids and decrease their impact strength. Also, additional cutouts on the outer strap provide potential grid-to-grid hang-up locations during fuel handling.

Figure 28:
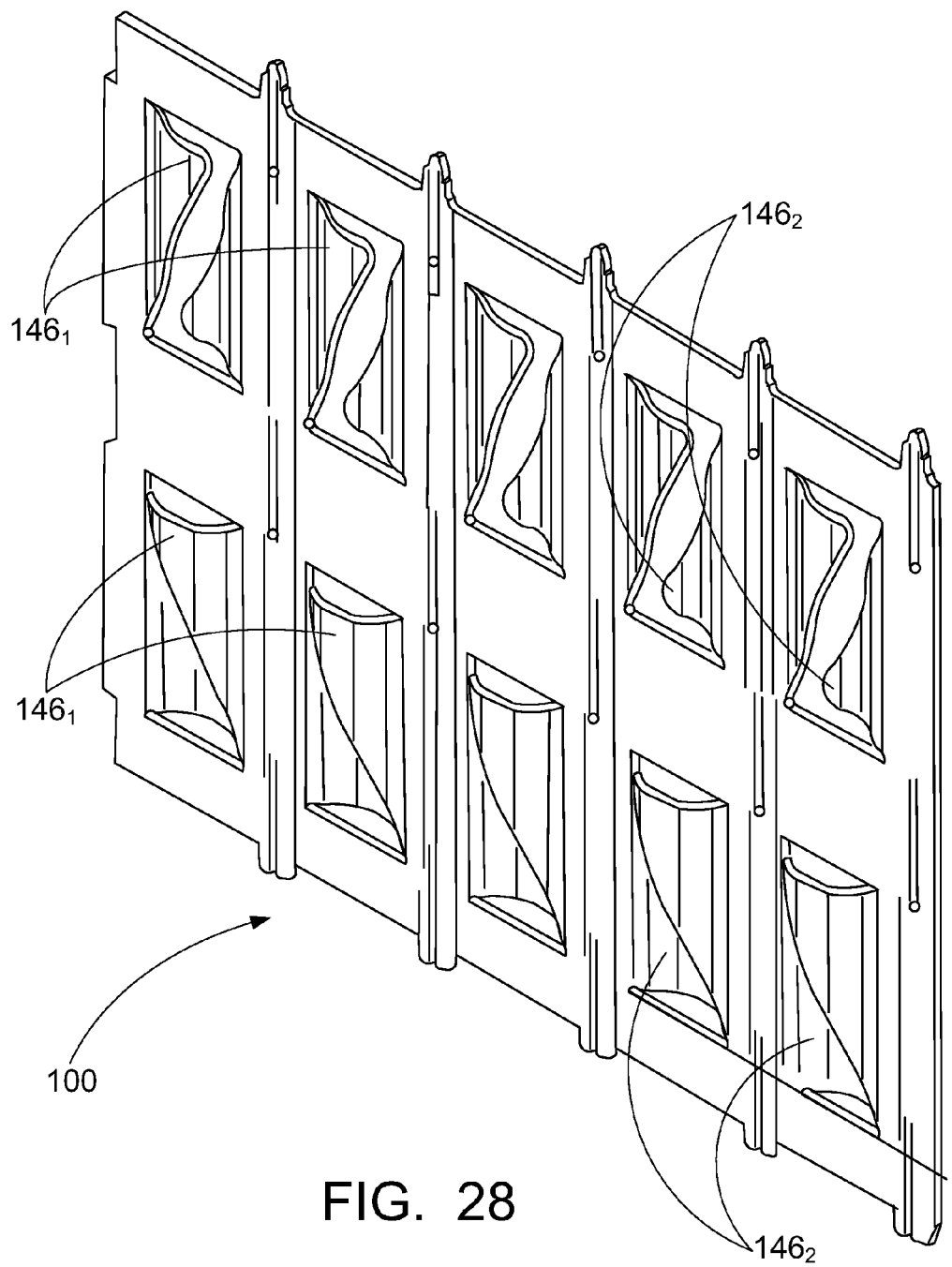

With reference to FIGS. 28-30, a transition strap 100 with a dual horizontal nested cantilever spring design is described. The strap 100 includes two horizontal cantilever spring features $146_1$, $146_2$ arranged one above the other on the strap 100. FIG. 28 shows a perspective view of a portion of the transition strap 100, FIG. 29 shows a side view of the transition strap 100, and FIG. 30 shows an overhead view (or a view from below) of the strap 100. The orientation of the springs $146_1$, $146_2$ in any given cell alternates such that the thick root of the upper spring $146_1$ is positioned vertically above the thin hook on the lower spring $146_2$, thereby allowing the dual springs to be "nested" into less strap "real estate" than would otherwise be required. This vertical stacking of the springs $146_1$, $146_2$ is reversed from cell to cell to balance the twisting moments applied to the interior grid straps. The transition strap 100 thus includes twice as many springs as an ordinary (i.e., non-transition) interior strap.

Figure 31:
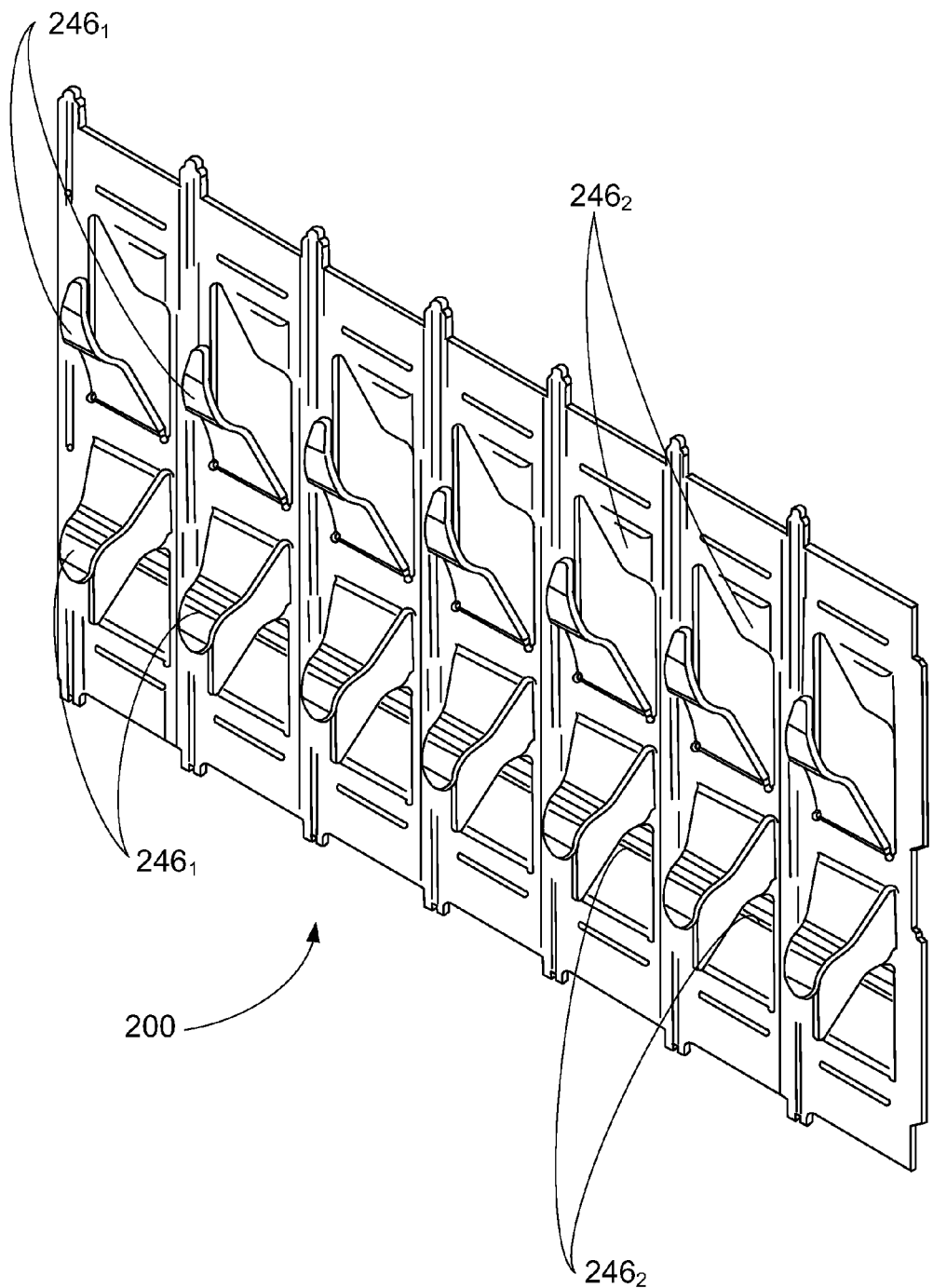
FIGS. 31-33 show another alternative transition strap design employing an alternative spring configuration.
Figures 32, 33:
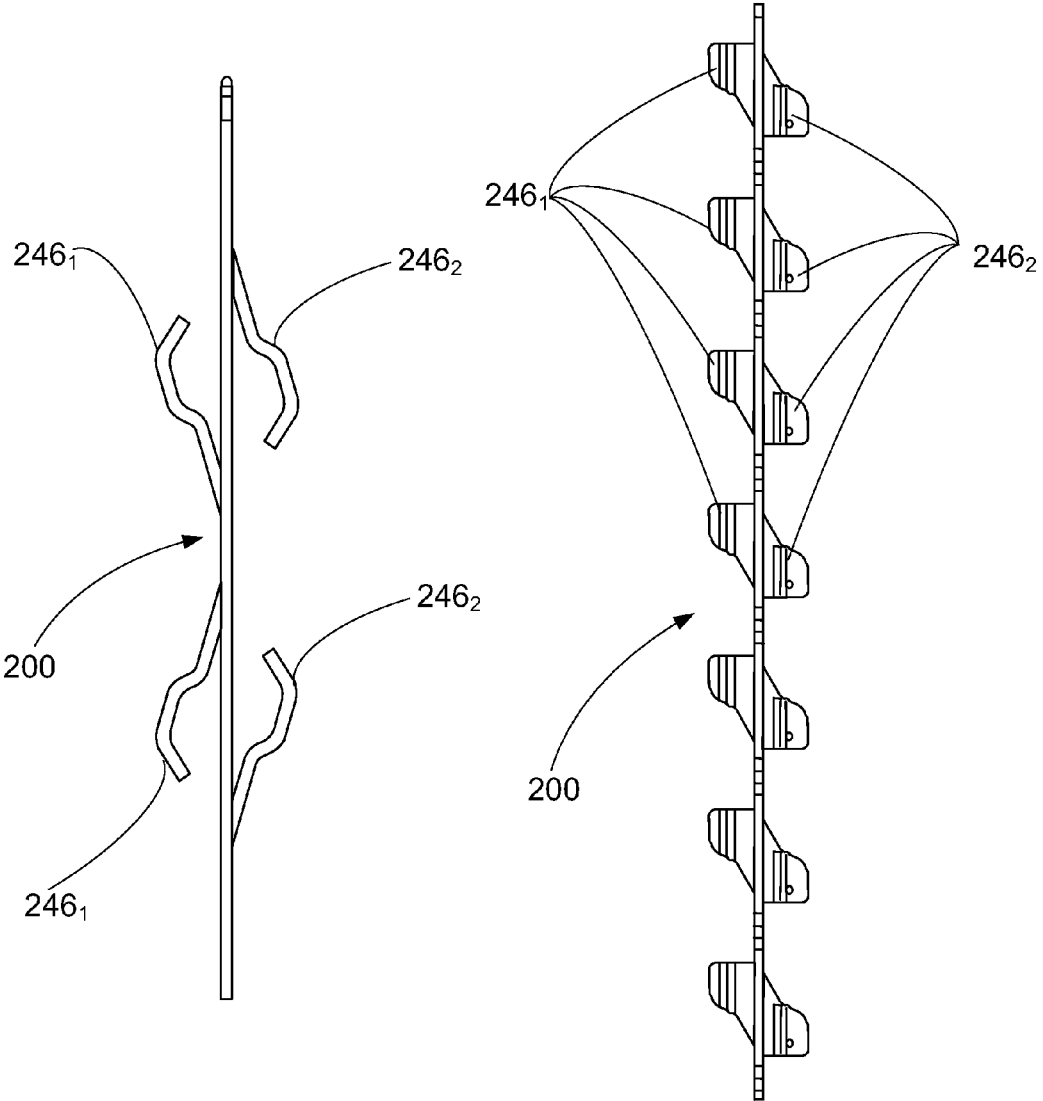

With reference to FIGS. 31-33, a transition strap 200 with side-by-side nested vertical cantilever springs $246_1$, $246_2$ is described. FIG. 31 shows a perspective view of a portion of the transition strap 200, FIG. 32 shows a side view of the transition strap 200, and FIG. 33 shows an overhead view (or a view from below) of the strap 200. This design is a variation on the dual vertical spring design in which the two vertical cantilever spring features $246_1$, $246_2$ are arranged side by side on the transition strap 200. Each spring $246_1$, $246_2$ is tapered and formed similar to the springs 46 of the interior strap 40 (see FIGS. 3, 8, and 9). The orientation of the two springs $246_1$, $246_2$ in any given cell alternates such that the thick root of the upper spring is positioned at the same elevation as the thin hook on the adjacent spring feature. This again allows the dual springs to be "nested" into less strap "real estate" than required in the current dual vertical spring design resulting in a narrower strap. Like the transition strap 100, the transition strap 200 includes twice as many springs as an ordinary (i.e., non-transition) interior strap.

Figure 34:
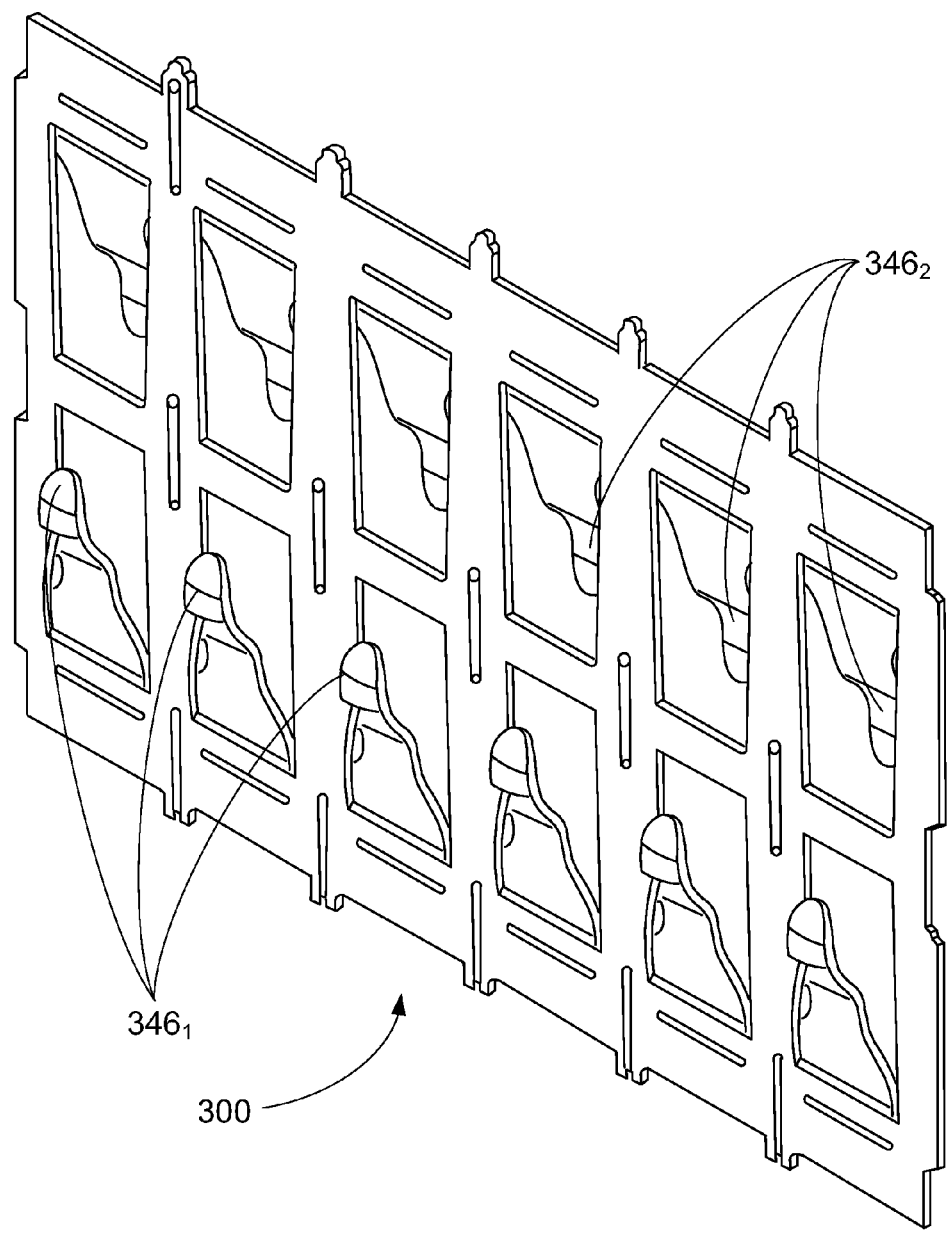
FIGS. 34-36 show another alternative transition strap design employing an alternative spring configuration.
Figures 35, 36:
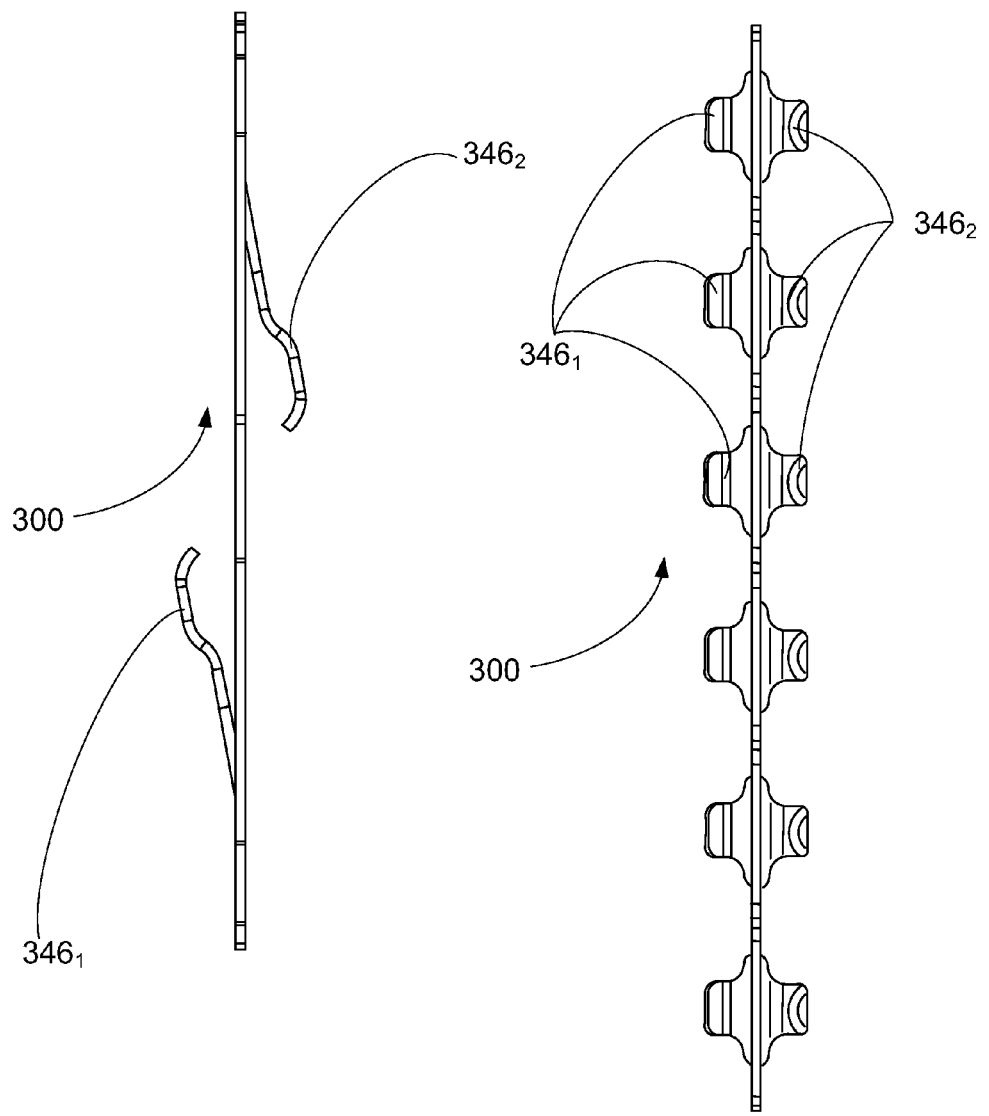

With reference to FIGS. 34-36, a transition strap 300 is similar to the design of FIG. 10 in that it omits some springs. The transition strap 300 has a reversed-orientation dual vertical cantilever spring design with springs $346_1$, $346_2$. FIG. 34 shows a perspective view of a portion of the transition strap 300, FIG. 35 shows a side view of the transition strap 300, and FIG. 36 shows an overhead view (or a view from below) of the strap 300. This variation on the dual vertical spring design differs in that the springs $346_1$, $346_2$ are stacked hook-to-hook rather than base-to-base resulting in a fuel rod contact geometry more like the conventional six-contact cell geometry in which the spring features grip the fuel rod at approximately the mid-elevation between the opposing dimples. This conventional loading arrangement creates a local bending moment at every spacer grid that can contribute to in-reactor fuel rod bow. In addition, the hook-to-hook spring orientation induces unbalanced twisting moments on the interior grid straps that are undesirable. Like the transition strap of FIG. 10, in the transition strap 300 one half of the springs face in one direction and the other half of the springs face in the opposite direction.

In the foregoing spacer grid designs, the springs 46, $46_1$, $46_2$, $146_1$, $146_2$, $246_1$, $246_2$, $346_1$, $346_2$ of the spacer grid have a lower spring constant (i.e. are less stiff) while the dimples 44, $44_1$, $44_2$ have a higher spring constant (i.e. are more stiff). In some embodiments, the springs have a spring constant that is no larger than one-half of the spring constant of the dimples. In some embodiments, the springs have a spring constant of 500 pounds/inch or less while the dimples have a spring constant of 1000 pounds/inch or higher. However, other spring constants and/or spring constant ratios are contemplated.

The preferred embodiments have been illustrated and described. Obviously, modifications and alterations will occur to others upon reading and understanding the preceding detailed description. It is intended that the invention be construed as including all such modifications and alterations insofar as they come within the scope of the appended claims or the equivalents thereof.

We claim:
1. An apparatus comprising:
a spacer grid including a plurality of intersecting straps including a first set of mutually parallel straps including a first transition strap with a first set of springs and a second set of springs, and a second set of mutually parallel straps including a second transition strap with a first set of springs and a second set of springs, the second set of mutually parallel straps intersecting the first set of mutually parallel straps, the intersection of the first transition strap and the second transition strap defining a transition point in the spacer grid that is not at the center of the spacer grid, the plurality of intersecting straps defining cells with springs and dimples arranged to engage fuel rods passing through the cells;
wherein the first set of springs of the first transition strap face in one direction and the second set of springs of the first transition strap face in the opposite direction, the first set of springs of the second transition strap face in one direction and the second set of springs of the second transition strap face in the opposite direction,
wherein the direction of the springs switches at the transition point in the spacer grid, and
the springs formed into the straps of the first set of mutually parallel straps other than the first transition strap face away from the first transition strap, and the springs formed into the straps of the second set of mutually parallel straps other than the second transition strap face away from the second transition strap.

2. The apparatus of claim 1 wherein the dimples formed into the straps of the first set of mutually parallel straps other than the first transition strap face toward the first transition strap and the dimples formed into the straps of the second set of mutually parallel straps other than the second transition strap face toward the second transition strap.

3. The apparatus of claim 2 wherein the first transition strap does not include dimples and the second transition strap does not include dimples.

4. The apparatus of claim 2 wherein the outer straps of the plurality of intersecting straps include dimples but do not include springs.

5. The apparatus of claim 2 wherein the first transition strap includes two back-to-back straps with outwardly facing springs and the second transition strap includes two back-to-back straps with outwardly facing springs.

6. The apparatus of claim 1 wherein the transition point in the spacer grid is spaced apart from the center of the spacer grid by at least two cells.

7. A fuel assembly comprising fuel rods comprising fissile material held in a spaced apart arrangement by spacer grids set forth in claim 1.

8. A nuclear reactor comprising a pressure vessel containing a nuclear reactor core wherein the nuclear reactor core includes fuel rods comprising fissile material held in a spaced apart arrangement by spacer grids set forth in claim 1.

9. An apparatus comprising:
a spacer grid including intersecting straps having springs and dimples formed into the straps, the intersecting straps defining cells with the springs and dimples arranged to hold fuel rods passing through the cells, the intersecting straps including:
a first set of mutually parallel straps including a first transition strap having a plurality of springs extending outwardly from opposite sides thereof, and
a second set of mutually parallel straps including a second transition strap having a plurality of springs extending outwardly from opposite sides thereof, the second set of mutually parallel straps intersecting the first set of mutually parallel straps, the first transition strap and the second transition strap being interior straps of the spacer grid, the springs formed into the first set of mutually parallel straps other than the first transition strap facing away from the first transition strap, the springs formed into the second set of mutually parallel straps other than the second transition strap facing away from the second transition strap, the dimples formed into the first set of mutually parallel straps other than the first transition strap facing toward the first transition strap, the dimples formed into the second set of mutually parallel straps other than the second transition strap facing toward the second transition strap.

10. The apparatus of claim 9 wherein:
dimples are not formed into the first transition strap, and dimples are not formed into the second transition strap.

11. The apparatus of claim 10 wherein:
springs are not formed into the outer straps of the spacer grid, and
dimples are formed into the outer straps of the spacer grid.

12. The apparatus of claim 9 wherein:
springs are not formed into the outer straps of the spacer grid, and
dimples are formed into the outer straps of the spacer grid.

13. The apparatus of claim 9 wherein:
one half of the plurality of springs formed into the first transition strap face in one direction and the other half of the plurality of springs formed into the first transition strap face in the opposite direction; and
one half of the plurality of springs formed into the second transition strap face in one direction and the other half of the plurality of springs formed into the second transition strap face in the opposite direction.

14. The apparatus of claim 9 wherein:
the first transition strap includes a first two back-to-back straps with springs formed into the first two back-to-back straps facing outward from the first two back-to-back straps, and
the second transition strap includes a second two back-to-back straps with springs formed into the second two back-to-back straps facing outward from the second two back-to-back straps.

15. The apparatus of claim 9 wherein:
the first transition strap includes twice as many springs as any other strap of the first set of mutually parallel straps with the springs formed into the first transition strap defining two groups of springs facing in opposite directions, and
the second transition strap includes twice as many springs as any other strap of the second set of mutually parallel straps with the springs formed into the second transition strap defining two groups of springs facing in opposite directions.

16. The apparatus of claim 9 wherein the springs have a spring constant that is no larger than one-half of the spring constant of the dimples.

17. The apparatus of claim 9 wherein the springs are cantilevered springs.

18. A fuel assembly comprising fuel rods comprising fissile material held in a spaced apart arrangement by spacer grids set forth in claim 9.

19. An apparatus comprising:
a spacer grid including intersecting straps having springs and dimples formed into the straps, the intersecting straps defining cells with the springs and dimples arranged to hold fuel rods passing through the cells, the outer straps of the spacer grid including dimples but not including springs.

20. The apparatus of claim 19 wherein the intersecting straps comprise:
a first set of mutually parallel straps including a first transition strap having a plurality of springs extending outwardly from opposite sides thereof; and
a second set of mutually parallel straps including a second transition strap having a plurality of springs extending outwardly from opposite sides thereof, the second set of mutually parallel straps intersecting the first set of mutually parallel straps;
wherein the first transition strap and the second transition strap are interior straps of the spacer grid;
the springs of the first set of mutually parallel straps other than the first transition strap face away from the first transition strap; and
the springs of the second set of mutually parallel straps other than the second transition strap face away from the second transition strap.

21. The apparatus of claim 20 wherein the first transition strap includes springs but does not include dimples and the second transition strap includes springs but does not include dimples.

* * * * *